US006000595A

United States Patent [19]

Crowley et al.

[11] Patent Number: 6,000,595

[45] **Date of Patent: *Dec. 14, 1999**

[54] METHOD AND APPARATUS FOR PINLESS FEEDING OF WEB TO A UTILIZATION DEVICE

[75] Inventors: H. W. Crowley, Eliot, Me.; John W. Clifford, Ashland, Mass.; William F. Bolza, Chelmsford, Mass.; Tamas Hetenyi, Concord, Mass.; Richard A. Sjostedt, Ashland, Mass.

[73] Assignee: Roll Systems, Inc., Burlington, Mass.

[ * ] Notice: This patent is subject to a terminal disclaimer.

[21] Appl. No.: 08/992,066

[22] Filed: Dec. 17, 1997

[51] Int. Cl.[6] .......................... B23Q 15/00; B65H 23/18

[52] U.S. Cl. .......................... 226/15; 226/20; 226/42; 226/44

[58] Field of Search .......................... 226/15, 16, 20, 226/21, 42, 44

[56] References Cited

U.S. PATENT DOCUMENTS

| | | | |
|---|---|---|---|
| 4,685,664 | 8/1987 | Petersdorf | 226/20 X |
| 5,193,727 | 3/1993 | Crowley | 226/24 |
| 5,359,181 | 10/1994 | Waechtler et al. | 226/21 X |
| 5,480,085 | 1/1996 | Smithe et al. | 226/42 X |
| 5,485,386 | 1/1996 | Andreasson | 226/42 X |

FOREIGN PATENT DOCUMENTS

| | | |
|---|---|---|
| WO 96/14261 | 5/1996 | WIPO . |
| WO 97/36211 | 10/1997 | WIPO . |

*Primary Examiner*—Donald P. Walsh
*Assistant Examiner*—William A. Rivera

[57] ABSTRACT

A system and method for utilizing a continuous pinless web that is free of tractor pin feed holes within a utilization device that is originally adapted to feed web having tractor pin feed hole strips along its widthwise edges is provided. The utilization device can comprise an IBM high-volume laser printer having an image transfer drum synchronized to a pair of tractor pin feed drive units. A drive roller is operatively connected to the lower pin feed unit according to a preferred embodiment. A registration controller is utilized to synchronize the movement of the web with the operation of the utilization device element using a differential and a separate registration motor. The image transfer drum and drive roller are each synchronized to a central drive motor that generates pulses via an encoder. The pulses track the movement of the image transfer drum. A mark sensor reads marks on the web to synchronize actual movement of the web with the image transfer drum using the registration motor. The movement of the registration motor is averaged over the length of each section or page in the web to avoid jump discontinuities. The printer's fuser section draws web from the image transfer element at a controlled rate and with a desired steering alignment. Signals that emulate those originally generated by a skew/advance/retard sensor that tracks pin feed holes are generated by comparing fuser drive pulses to drive motor pulses and monitoring the location of the pinless web edge as it passes under a dedicated edge location sensor.

16 Claims, 30 Drawing Sheets

METHOD AND APPARATUS FOR PINLESS FEEDING OF WEB TO A UTILIZATION DEVICE

FIELD OF THE INVENTION

The present invention relates generally to a method and apparatus for transferring tractor pin feed hole-free web to and from a utilization device normally adapted to drive web using a tractor pin feed arrangement.

BACKGROUND OF THE INVENTION

In high-volume printing applications, high-volume electronic or "laser" printers such as the IBM® 3800™ and 3900™ series, as well as the Siemens® 2140™, 2200™, and 2240™ series, lay down computer-generated images (at a rate of 100 or more standard images per minute) on a continuous web by directing the web through an image element, that, typically, comprises a moving image drum having toner deposited thereon. A portion of such a web 12 is illustrated in FIG. 1. The feeding of the web 12 to the image drum is facilitated by one or more "tractor pin" feed units that engage evenly spaced holes 14 disposed along opposing widthwise edges of the web on "pin feed" strips 16. The widthwise edges having "tractor pin feed holes" therein, as well as the sheets themselves often include perforations 17, 18, respectively, for easy removal.

A typical pin feed application is depicted in FIG. 2. A source 20 of continuous web 22 is driven (arrow 24) to an image transfer element 26 of a printer 28. Toner 30 is provided to the image transfer element or drum 26 by operation of the optical print head 32. A separate developer 34 is provided to attract the toner to the drum 26. The web 24 engages the image drum 26 at a transfer station 36 where printing is laid upon the web as it passes over the image drum 26. The image drum rotates (arrow 38) at a speed matched to the speed of web travel. This is often accomplished by gearing or drive belts that interconnect the tractor pin feed units 40, 42 and the drum to a central drive motor. The web 24 is driven to and from the image drum 26 by a pair of tractor units 40 and 42 that each include a plurality of pins 44 on moving endless tractor belts 45 for engaging pin holes in the edges of the web. The pin holes 14 are moving endless tractor belts 45 for engaging pin holes in the edges of the web. The pin holes 14 are detailed in FIG. 1 discussed above.

Downstream of the tractor pin feed units 40 and 42, the web 24 is directed over a fuser 46 and a preheat unit 48 that fixes the toner to the web 24. The web is subsequently directed to a puller unit 50 that comprises a pair of pinch rollers, and into a director chute 52 onto a stack of zigzag folded finished web 54.

A significant disadvantage of a printer arrangement according to FIG. 2 is that the additional inch to inch and one-half of web that must be utilized to provide the tractor feed hole strips entails significant waste. The web area between the tractor feed pin hole strips already comprises a full-size page and, thus, the tractor feed strips represent area having no useful function other than to facilitate driving of the web into the printer. In a typical implementation, the pin holes are subsequently torn or cut off and disposed of following the printing process.

A challenge in modifying existing tractor pin feed utilization devices, such as the high-volume IBM® 3900 Series laser printer illustrated in FIG. 2 is that a number of sensor signals rely upon the scanning of tractor pin feed holes. For example, the fuser section 46 draws the web from the drive section of the image drum 26 at a relatively synchronized rate. In order to maintain synchronization, and to ensure that the side edges of the web do not move laterally, electro-optical advance sensors and skew sensors are used adjacent the fuser section. These sensors scan for the location of tractor pin feed holes. The holes are required to operate these sensors. However, when holes are absent, an alternate sensing arrangement must be utilized.

In a pinless drive of web through a portion of a utilization device it may be desirable to provide correction to the feed rate of the web to maintain the web relative to the image drum or other utilization drive element. Registration can be controlled by providing a differential drive to the main pinless drive element when an offset in proper registration is deleted. However, the offset may be significant enough that the input registration correction by the differential drive may cause a sudden "jump" discontinuity in the web. Particularly where toner is laid down by an image drum this discontinuity of the applied image.

A variety of utilization devices currently employ tractor pin feed continuous web. Such a feed arrangement is a standard feature on most devices that utilize more than 80 pages per minutes. Specialized equipment has been developed to automatically remove tractor pin feed strips when they are no longer needed. Hence, substantial cost and time is devoted to a web element that does not contribute to the finished appearance of the completed printing job. However, such tractor pin feed strips have been considered, until now, a "necessary evil" since they ensure accurate feeding and registration of web through a utilization device.

It is, therefore, an object of this invention to provide a reliable system for feeding continuous web through a utilization device that does not entail the use of wasteful edgewise strips having tractor pin feed holes.

It is another object of this invention to provide a system and method for feeding web that ensures accurate registration of the web with other moving elements of a utilization device and enables web to be directed to a variety of locations.

It is a further object of this invention to provide a system and method of feeding pinless web particularly through a utilization device having a fuser section with a separate fuser section with a fuser motor downstream of an image drum drive section. The system and method should ensure adequate registration between each section in the absence of pin feed holes to enable registration serving.

It is a further object of this invention to provide registration control to a drive for pinless web in a utilization device that evenly applies registration control evenly over a web section to avoid abrupt registration correction that could cause discontinuities.

SUMMARY OF THE INVENTION

This invention relates to a system and method for utilizing a continuous pinless web that is free of tractor pin feed holes within a utilization device that is originally adapted to feed web having tractor pin feed hole strips along its widthwise edges is provided. The utilization device can comprise an IBM high-volume laser printer, capable of printing 100 or more standard pages of images per minute, and having an image transfer drum synchronized to a pair of tractor pin feed drive units. A drive roller is operatively connected to the lower pin feed unit according to a preferred embodiment. A registration controller is utilized to synchronize the movement of the web with the operation of the utilization device element using a differential and a separate registration motor. The image transfer drum and drive roller are each synchronized to a central drive motor that generates pulses via an encoder. The pulses track the movement of the image transfer drum. A mark sensor reads marks on the web to synchronize actual movement of the web with the image transfer drum using the registration motor. The movement of the registration motor is averaged over the length of each section or page in the web to avoid jump discontinuities. The printer's fuser section draws web from the image transfer element at a controlled rate and with a desired steering alignment. Signals that emulate those originally generated by a hole tracking skew/advance/retard sensor are generated by comparing fuser drive pulses to drive motor pulses and monitoring the location of the pinless web edge as it passes under a dedicated edge location sensor.

According to a preferred embodiment, the drive motor can include an advance and retard mechanism that is responsive to the controller to maintain the driven web in synchronization with the utilization device element. A registration drive motor and a differential gearing system can be provided to enable advancing and retarding of the drive roller. The drive element can comprise a harmonic drive differential.

The upper, downstream, tractor pin feed assembly of this invention can include a vacuum belt drive that prevents slippage of pinless web under tension applied by various components of the utilization device.

While the term "drive roller" is utilized according to this embodiment, it is contemplated that a variety of different driving mechanisms that enable advancing of a web to a utilization device element can be utilized according to this invention. It is of primary significance that such devices be capable at advancing a web that is free of tractor pin feed holes along the edges thereof or otherwise thereon. For example, a drive belt or belts can be substituted for the drive roller and the word "roller" is particularly contemplated to include such a belt or belts. Similarly, the drive can comprise a full-width roller or reciprocating foot or shoe that advances the web in selected increments. In a preferred embodiment the drive roller is operatively connected to the central drive motor of the system—which is synchronized to the movement of the utilization device element (image drum)—by gears, belts, or the like.

According to a preferred embodiment a method for controlling a continuous pinless web that is free of tractor pin feed holes on edges thereof includes the providing of a pinless web to a high-volume electronic printer, or other utilization device, that includes a drive roller, synchronized with a central drive motor, that is also synchronized with a moving utilization device element, such as image transfer drum. The central drive motor or a related component, such as an encoder, generates pulses as predetermined length increments of web pass over the image transfer drum. In particular, movement of the drive roller causes the generation of pulses. Typically pulses are generated without regard to the actual location of the web and are used as an indication of the relative movement of the image transfer drum.

The web includes marks at predetermined spacings therealong that typically correspond to successive pages or sections of the web. A mark sensor is located at a known distance upstream of the contact point of the image transfer drum.

The printer further includes a fuser section downstream, in a direction of web travel, from the image transfer element. The fuser section includes a fuser drive element for drawing the web from the image transfer element at a selected draw rate. Between the fuser section and the image transfer element is located a dancer that moves in proportion to an amount of web between the image transfer element and the fuser section to generate a dancer signal that indicates an amount of tautness or slack in the web. Also located between the fuser section and the image transfer element. In its original configuration, the printer includes a skew/advance sensor that reads passage of tractor pin feed holes to generate (a) a time-based, pulsed skew signal that indicates a location of an edge of the web in a direction transversed to the downstream direction and (b) a time-based, pulse advance/retard signal that indicates a relative location of the web as the web moves in the downstream direction. A fuser section controller controls the draw rate of the fuser drive element based upon the dancer signal and the advance/retard signal. The controller steers the web transverse to the downstream direction in response to the skew signal. In order to effectively feed continuous, pinless web between the image transfer element and the fuser section, operation of the combined skew/advanced sensor of the original configuration must be emulated. To emulate operation without the use of pin feed holes, pulses are derived from an encoder located on the fuser drive as predetermined length increments of pinless web pass through the fuser section based upon movement of the fuser drive element. The number of drive pulses is compared to the number of fuser pulses to thereby derive a time-based, pulse advance/retard signal of a relative position of the pinless web in the downstream direction at both the image transfer element and the fuser section. Similarly, an edge location sensor is located to read the passage of the pinless edge thereover. The edge location sensor is, typically, an optical sensor that generates a signal proportional to the amount of sensor area that is covered by the edge. Based upon the amount of edge covered, another time-based, pulsed skew signal proportional to the relative offset of the edge from a desired location is generated. Based upon the newly-derived signals, the original configuration controller can steer the pinless web and control advance and retard of the pinless web without the need of tractor pin feed holes.

If the dancer moves beyond a predetermined limit, the counting of pulses, which is used to derived the advance/retard signal is reset. The fuser drive is driven at an overspeed or underspeed to relocate the dancer at a desired "steady-state" position, at which time a new initial point for beginning counting of pulses is established.

One or more look-up tables can be used to translate the pulse count and edge sensor values into appropriate time-base pulsed skew signals. The pulsing of skew signals is, in particular, timed to the original configuration or "native" strobing of the original configuration skew/advance sensor.

According to another embodiment, a method for controlling movement of a continuous web that is free of tractor pin feed holes that allows registration of the web without undesirable jump-discontinuities in registration correction is provided. Registration is controlled by sensing marks located at even intervals along the web, typically representative of pages or sections. The distance from the mark sensor to the contact point of the image transfer drum is known. The page length of a page that is currently upstream on the web from the image transfer drum is determined. In one embodiment, the page length is determined by counting the number of pulses occurring when a mark is sensed adjacent the section or page to be measured. This counting is compared with a known location of the image transfer drum along its movement path on the current page. The total distance, along with the known location of the current page is used to derived the length of the upstream page or section. The length of the current page is stored in a shift register that shifts each time a next page is presented to the image transfer drum. The offset of the section from a desired synchronization with the image transfer element is also determined based upon when the mark is senses relative to when it should be sensed given the pulse count, when compared with the movement of the image transfer drum. Based upon the offset, a correction factor is derived. The correction factor is fed back to the pulse count to update the pulse count while the registration motor applies a correction to the drive roller when the page-to-be corrected is finally presented to the image transfer drum. To avoid jump-discontinuities, the correction factor is divided over the page length to derive a correction rate. The correction rate is applied to the registration motor so that the correction is spread over the entire length of page passing through the image transfer drum. In other words, correction begins when the leading edge of the page or section reaches the contact point of the image drum and proceeds until the trailing edge passes through the contact point of the image transfer drum. This spreading of the correction ensures that the correction has a minimal effect on the appearance of the page or section.

According to an alternate embodiment, the foregoing procedure can be used to automatically accommodate pages that are sized to a different measurement standard. For example, where the printer is calibrated in English System increments (e.g., pulses correspond to English System measurements), the printer can automatically convert to pages or section gauged in Metric System measurements such as A4. The operator inputs a Metric System standard page length which is converted by a look-up table to the closest English increment equivalent. The difference between the actual Metric System length and the English equivalent becomes an automatic correction factor that is provided to the registration motor and to the counting step as each Metric System page passes through the image drum.

The page length can be stored as pulses or as an absolute length value. Where it is an absolute length value, the correction factor between Metric and English system measurements (or any other pair of incompatible measurement systems) can easily be provided. It is contemplated that page length measurement can be either an absolute value or a pulse-based value, accordingly.

BRIEF DESCRIPTION OF THE DRAWINGS

The foregoing and other objects and advantages of the invention will become more clear with reference to the following detailed description of the preferred embodiments as illustrated by the drawings in which.

DETAILED DESCRIPTION

I. General Considerations

Figure 3:
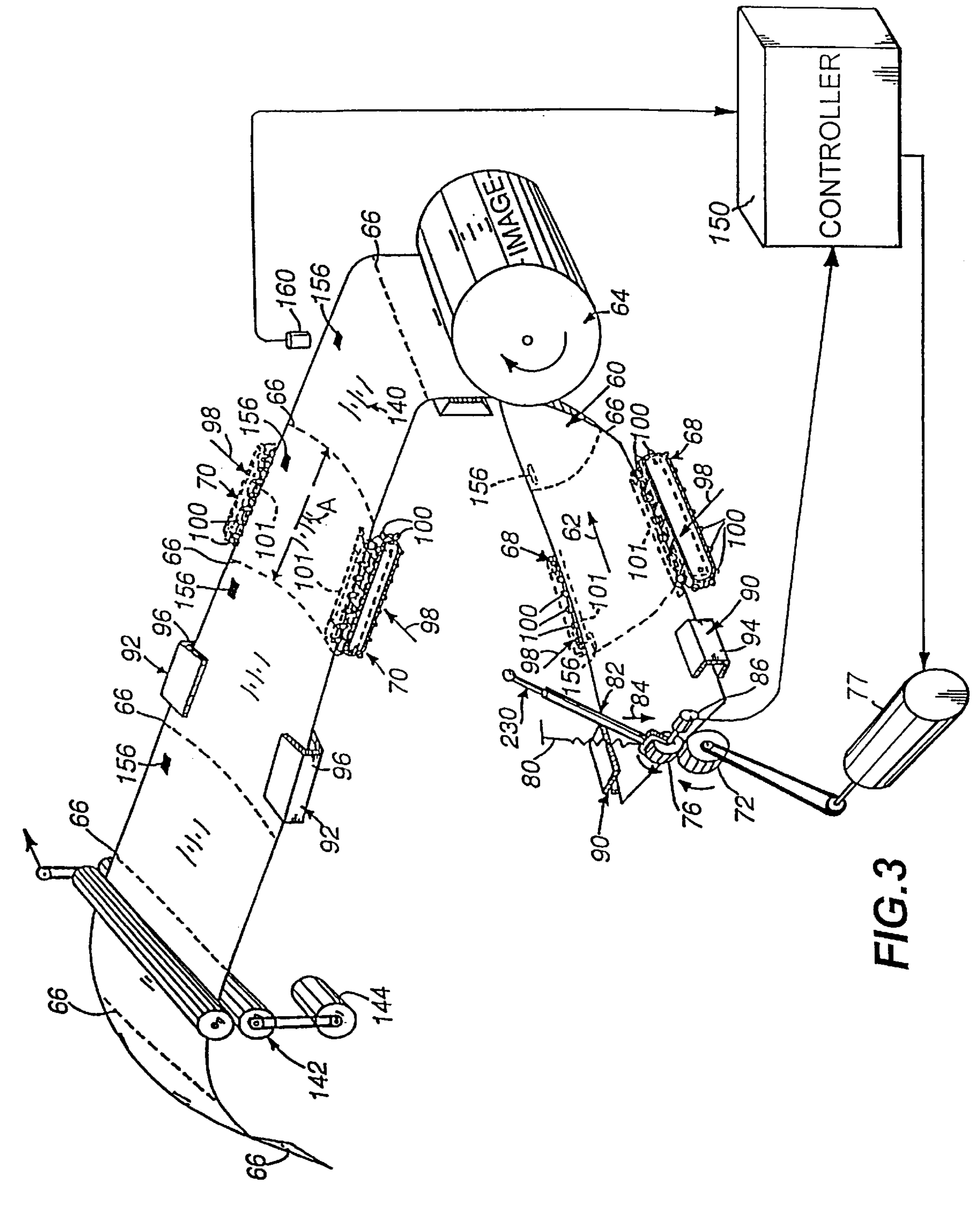
FIG. 3 is a schematic perspective view of a pinless web feed system according to a preferred embodiment.

A system for feeding web to a utilization device image drum, without use of tractor pin feed holes, is depicted in FIG. 3. A web 60 is shown moving in a downstream direction (arrow 62) to an image transfer drum 64 of conventional design. The web 60 according to this embodiment can include perforations 66 that define standard size sheets therebetween. A distance A separates the perforations 66. For the purposes of this discussion, A shall be taken as a standard page length of 11 inches, 14 inches or a Metric A4 page length, but any suitable dimension for both length and width of sheets is expressly contemplated. Note that perforations are optional and that an unperforated plain paper web is also expressly contemplated according to this invention. Printed sheets can be subsequently separated from such a continuous web by a cutter (not shown).

As noted above, virtually all high speed-high volume printers and web utilization devices have heretofore required the use of tractor pin feed systems to insure accurate feeding of continuous web through the utilization device. Since pin holes are provided at accurate predetermined locations along the edges of a prior art continuous web, the web is consistently maintained in registration with the moving elements of the utilization device. This is particularly desirable when a moving image drum is utilized, since any error in registration has a cumulative effect and causes substantial misalignment of the printed text upon the web. The misalignment may, over time, cause the text to overlap onto an adjoining sheet.

Accordingly, to provide an effective feeding system for utilization devices, a suitable replacement for each of the driving, guiding and registration functions normally accomplished by the tractor pin feed system is desirable. The embodiment of FIG. 3 represents a system that contemplates alternatives to each of the functions originally performed by the tractor pin feed system.

As detailed in FIG. 3, the web 60 lacks tractor pin feed strips. While not required, according to this embodiment the tractor pin feed drive elements 68 and 70 have been retained. Actual driving is, however, accomplished by a drive roller 72 located at the upstream ends of the image drum 64. The drive roller 72, according to this embodiment, is propelled by a belt-linked drive motor 76. The motor 76 can comprise a suitable electric drive motor having speed control capabilities. Alternatively, the motor (not shown) utilized for operating the tractor pin feed drive elements 68 and 70 can be employed, via appropriate gearing, to drive the drive roller 72.

The drive roller 72 can comprise a polished metallic roller that bears against a side of the web 60. The drive roller 72 can have a width of approximately one inch or more and should generate sufficient friction against the web 60 to ensure relatively slip-free drive of the web 60. A wider roller, narrower roller than that depicted, or a plurality of rollers is also contemplated.

In order to enhance the frictional engagement of the wheel 72 with the web 60, a follower roller 76 is provided. The follower roller 76 bears upon an opposing side of the web to form a pinch roller pair. The follower roller, according to this embodiment, includes a spring 80 that pressurably maintains (arrow 84) the follower roller 76 against the web 60 and drive roller 72 via a pivotal mounting bracket 82. The pressure should be sufficient to ensure that an appropriate driving friction is generated by the drive roller 72 against the web. The follower roller 76 can include an elastomeric wheel surface for slip-free movement relative to the web 60. Since the follower roller 76 rotates relative to the web in relatively slip-free engagement, the roller 76, according to this embodiment is interconnected with an encoder 86 or other sensor that generates appropriate electronic signals in response to a predetermined arcuate movement. Such arcuate movement can be translated into a relatively precise indication of the length of web passing through a corresponding drive element. The follower roller 76, thus, can be utilized as a registration mechanism. The encoder functions and the operation of this registration mechanism is described further below.

Since the tractor pin feed drives 68 and 70 are typically located substantially adjacent a given utilization device element (such as the drum 64), the tractor pin feed drives 68 and 70 normally provide sufficient guiding to ensure that the web is accurately aligned with the utilization device element (drum 64) in a conventional pin feed configuration. Such guiding results, in part, from the forced alignment of the web at its widthwise edges. Alignment is facilitated by the synchronous movement of pins at each side of the web and the fact that the pin feed drive members are typically elongated so that several pins engage each edge simultaneously. However, absent such forced alignment (in, for example, a pinless feed configuration), the natural flexibility of a web would tend to cause skewing and buckling at the utilization device element (image drum 64 in this embodiment).

In some circumstances, it may be possible to locate the drive roller 72 immediately adjacent the utilization device element (64) to reduce the risk of buckling in a pinless drive. However, this may prove impractical or impossible in many utilization devices due to space limitations or, accordingly, an alternative approach for guiding the web adjacent each of the drive elements 72 and 76 is provided according to this invention. Applicant's U.S. Pat. No. 4,909,426 (the teaching of which is expressly incorporated herein by reference) discloses a method and apparatus for guiding web that utilizes the natural beam strength of paper or other web material when formed into a trough with restrained side edges. In other words, by drawing the side edges of an elongated web toward each other so that the distance between the edges is less than the unbent width of the web, causes the web to form a trough that becomes rigid and resists buckling and lateral (side to side) movement. As such, the web can be driven effectively with accurate alignment downstream of the drive element.

Edge guiding according to this embodiment is provided by pairs of guide channels 90 and 92 located upstream and downstream of the image drum 64. The pairs of channels 90 and 84 are located so that end walls 94 and 96 are spaced from each other a distance that is less than the width of the unbent web. Accordingly, the web assumes a trough shape as depicted generally by the perforation lines 66. As noted above, the trough shape generates a beam-like characteristic in the web that maintains the edges in rigid alignment for introduction to the image drum 64. The channels 90 and 92 can be replaced with other structures having end walls such as a full trough.

The channels 90 or other guide structures are typically located adjacent the drive and follower rollers 72 and 76 to ensure the web remains aligned as it is driven. The guide structure can extend downstream to a location substantially adjacent the image drum. It is desirable that the web 60 be maintained relatively flat as it passes into the image drum 64 (or other utilization device element) so that the drum 64 can fully engage the web. If a full trough guide structure is utilized adjacent the drive and follower rollers 72 and 76 it is contemplated that an orifice (not shown) can be provided to enable the web to be engaged by the drive and follower rollers 72 and 76.

Even though the existing tractor pin feed drive elements 68 and 70 are not utilized according to this embodiment to effect drive of the web, these pin feeds drives can themselves accomplish the edge guide function. Most printer units such as the IBM® 3900™ series (statistics for which are available in IBM® 3900™ Advanced Function Printer Maintenance Library, Vol. 5 1–4, Third Edition (October 1992), SA37-0200-02) and the Siemens® 2200™ and 2240™ systems utilize pin feed drive elements that are movable toward and away each other (arrows 98) to ensure proper engagement of tractor pin feed drive elements with a given width of web. For example, the user engagement of tractor pin feed drive elements with a given width of web. For example, the user may wish to switch from standard 8 ½"×11" sheets to A4 standard sheets. According to this embodiment, each individual tractor pin feed drive element can be moved toward the other (arrows 98) until the pins 100 bear against the edges of the web. The pins can be moved so that their spacing from each other forms the desired trough shape in the web 60 (e.g., the distance of the wide edges of the opposing sets of pins from one another is less than the free width of the web. Since most tractor pin feed drive elements also include an overlying guide plates 101 (shown in phantom) the edges of the web 60 are restrained against upward movement when the web is formed into the trough shape.

Figure 4:
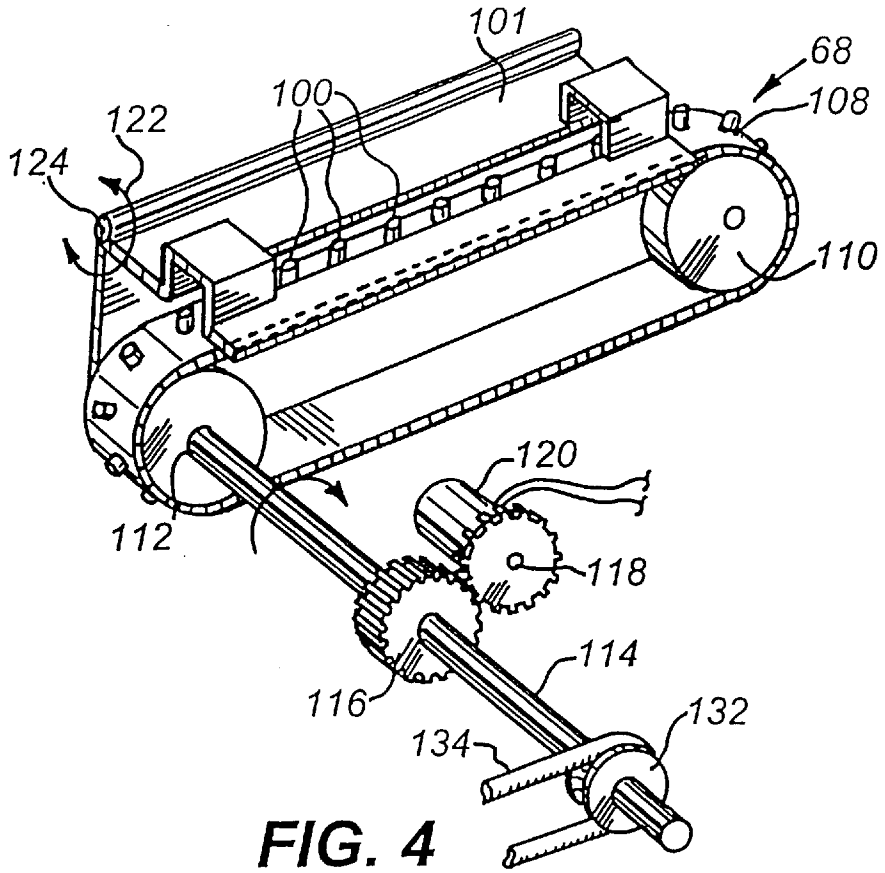
FIG. 4 is a somewhat schematic perspective view of a tractor pin feed element and drive mechanism according to this invention.

As further illustrated in FIG. 4, the exemplary tractor pin feed drive element 68 comprises an endless tractor belt 108 having the pins 100 projecting therefrom. The belt 108 is disposed between a pair of rollers 110 and 112. At least one of the rollers 112 is driven by a drive shaft 114 that can comprise a hexagonal cross-section drive shaft. A gear 116 is attached to the shaft 114 and engages a drive gear 118 that is interconnected with a drive motor 120. The drive motor can comprise a central drive motor that powers both tractor pin feed elements 68 and 70 according to this embodiment. In addition, as described further below, the drive motor arrangement can include an encoder that measures an incremental amount of web movement through the tractor pin feed drive elements.

As noted above, each tractor pin feed drive element 68 and 70 includes an overlying guide plate 101 that pivots (curved arrow 122) on an axis 124. This enables the guide plate 101 to be positioned adjacent and remote from the tractor pin feed belt 108 for loading and unloading of web.

Figure 5:
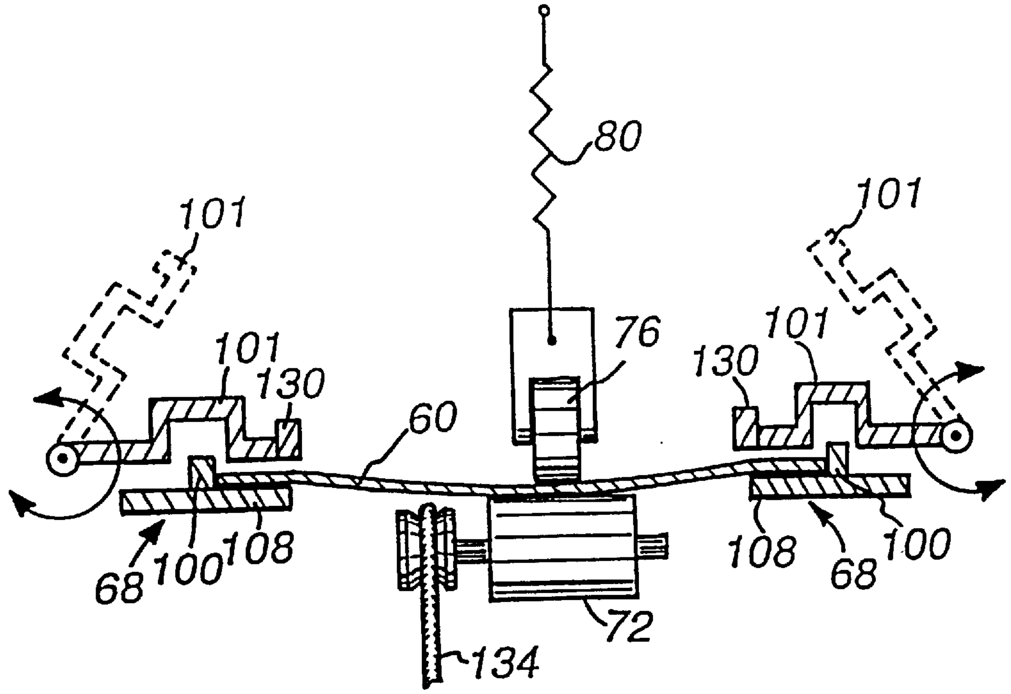
FIG. 5 is a somewhat schematic cross-section of a web positioned between the tractor pin feed elements according to this embodiment.

As further detailed in FIG. 5, each side of the tractor pin feed drive element 68, according to this embodiment, can be moved toward the other so that the web 60 forms a slight trough. Only a relatively small deflection in the web is necessary to ensure adequate beam strength. In this embodiment, the drive roller 72 is positioned approximately 0.025–0.030 inch below the plane formed by the tractor pin feed belts 108 to facilitate creation of the trough shape in the web 60.

It can be desirable in certain printer units such as the IBM® 3900™ series to extend the inwardly-directed length of the guide plates 101 to ensure proper edge restrain of the web 60. Thus, additional edge guides 130 are attached to each guide plate 101. These edge guides extend substantially the complete length of the guide plate in an upstream-to-downstream direction and have an inwardly directed width of approximately ¼ inch.

The blocks 130 are typically recessed approximately 0.020 inch above the lower face of the plates 101. Additionally, the blocks may include upwardly curving upstream edges. This configuration insures that the leading edge of a web will pass under the plates 101 during initial loading of the utilization device.

With further reference to FIG. 4, a pulley 132 can be provided to the drive shaft 114. The pulley 132 drives a belt 134 that can be interconnected with the drive roller 72 (FIG. 5) to facilitate driving of the drive roller 72 utilizing the existing tractor pin feed drive motor arrangement. Appropriate brackets can be provided to mount the drive roller 72 with respect to the underside of the web 60 as shown in FIG. 5.

Since the tractor pins 100 move on their respective belts 108 at a speed that substantially matches that of web travel through image drive 64 (via drive rollers 72, 76), the tractor pin feed drive elements 68 and 70 follow web movement and, thus, provide a relatively low-friction guiding mechanism. It is contemplated that most drive energy is still provided by the additional drive and follower rollers 72 and 76. As noted above, these drive elements 72 and 76 can be interconnected with the drive train of tractor pin feed units in some embodiments. Additionally, the use of tractor pin drives as guiding elements presumes that such elements are preexisting and that the pinless drive mechanism is a retrofitted installation to a utilization device.

Drive of the web 60 according to the prior art involves the use of two pairs of tractor pin feed drive assemblies 68 and 70 as depicted. However, the downstream tractor pin feed drive element 70 cannot easily be replaced with a drive member such as upstream drive roller 72. The text 140 transferred from the image transfer drum 64 is not yet fused to the web 60. Thus, applying a centralized drive roller to the web could potentially smudge or damage the image on the web. Additionally, it is desirable to enable printing across the entire width of a sheet, thus, edge rollers can be undesirable. While in some utilization device, a downstream drive roller can be provided without damaging the web, it is contemplated that downstream draw of the web according to this embodiment is regulated primarily by the fuser rollers 142 that simultaneously draw the web 60 and apply heat to fuse the image to the web 60. The downstream tractor feed drive element 70 is retained primarily for edge guiding of the web.

Figure 1:
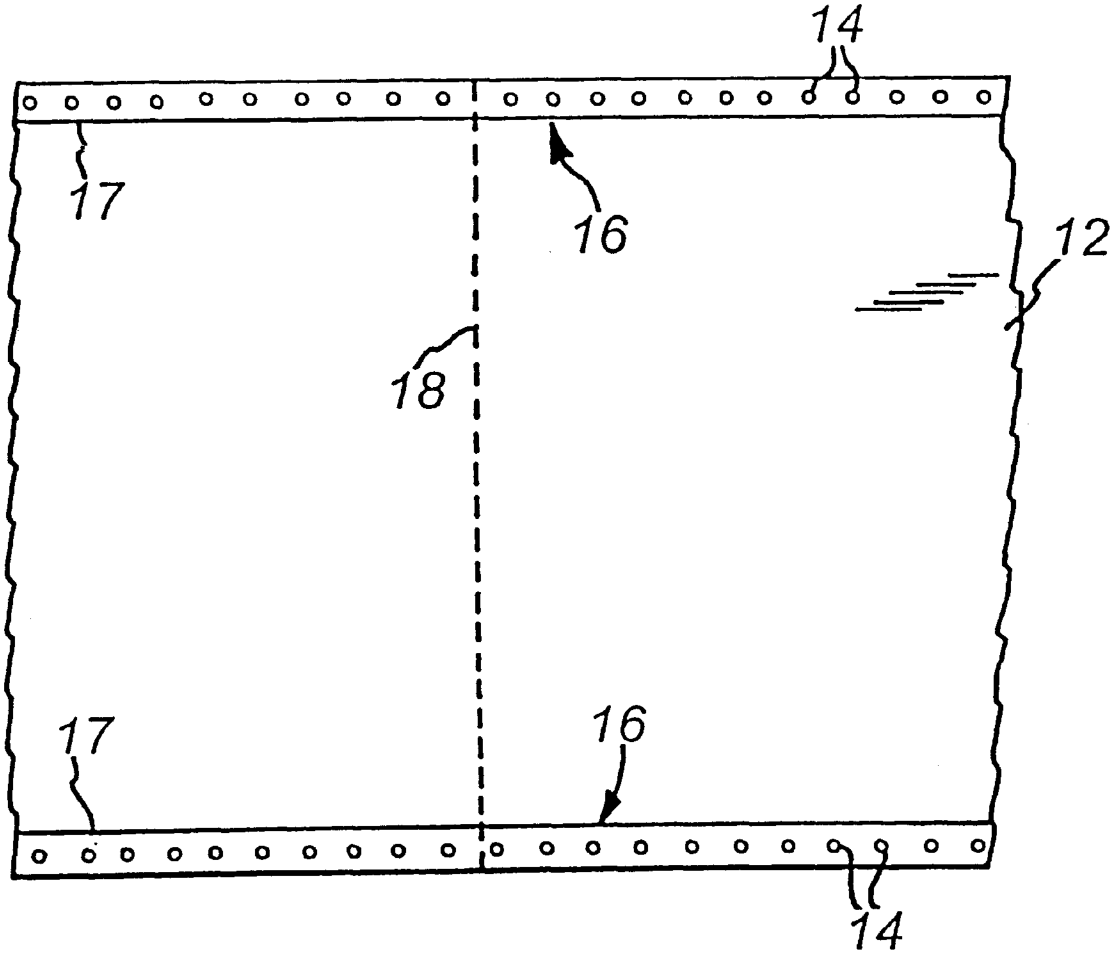
FIG. 1 (PRIOR ART)
FIG. 1 is a somewhat schematic plan view of a portion of a continuous web having pin feed strips according to the prior art.
Figure 2:
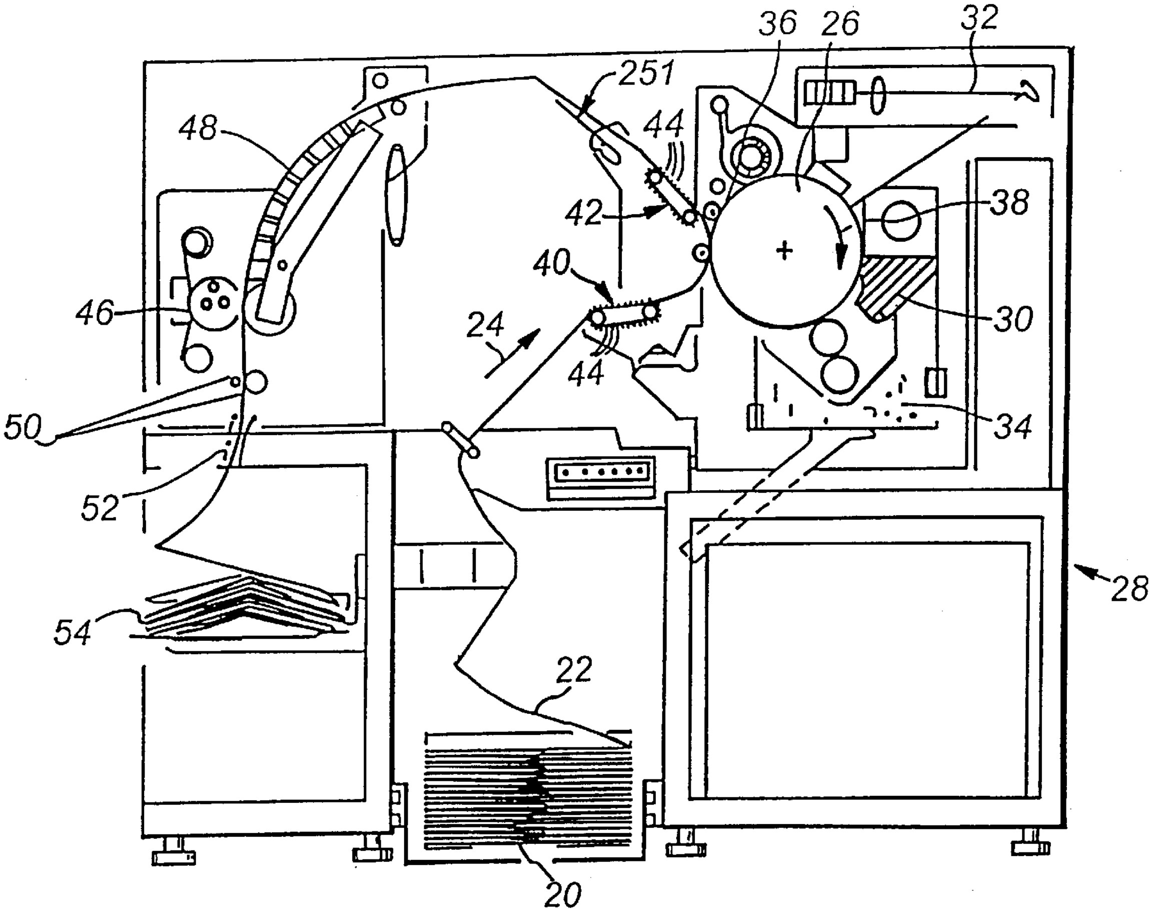
FIG.2 (PRIOR ART)
FIG. 2 is a somewhat schematic side view of a printer that utilizes continuous web having tractor pin feed drive members according to the prior art.

In the majority of utilization devices such as the IBM® 3900™ series printer, the speed of the fuser rollers is governed relative to the speed of the image transfer drum 64. In many units, a dancer roll pivotally engages the web at a point of free travel where slack can form. The pivot of the dancer 251 shown for example in FIG. 2 is located adjacent the downstream tractor pin feed drive assembly 70. The dancer roll includes a speed control that is interconnected with the drive motor 144 of the fuser rollers 142. According to this embodiment, speed control of the fuser roller 142 is typically s effected by a dancer roll or by sensing of a predetermined mark on the web. The use of such marks is described further below. Many utilization devices track the passage of the pin holes to govern speed. However, the absence of pin holes according to this embodiment necessitates of an alternate form of sensor.

Having provided an effective mechanism for both driving and guiding the web without use of tractor pin feed holes, there remains the provision of appropriate registration of the web 60 as it passes through the utilization device element. In a prior art tractor pin feed embodiment, as noted above, registration is provided naturally by the regular spacing of tractor pin feed holes along the web and the synchronization of the pin feed drive elements with the utilization device element. Absent the existence of pin holes on the web, some degree of slippage and variation in sheet length naturally causes misregistration of the web relative to the utilization device element over time. Hence, while a web may initially enter an image transfer element in perfect registration, the downstream end of the web could be offset by a half page or more causing text to be printed across a page break by completion of a large job.

Thus, registration of web relative to the utilization device element, according to this embodiment, involves the use of a mechanism that continuously determines the location of the web relative to the utilization device element (image transfer drum 64). As discussed above, the existing tractor feed drive (FIG. 4) or, alternatively, the follower roller 76 includes an encoder that generates pulses based upon passage of web 60 through the image transfer drum 64. 60 pulses per inch is a commonly-web standard. FIG. 3 illustrates a controller 150 that receives pulses from the encoder 86 on the follower roller 76 (or pin feed drive element 68, 70 drive train).

Figure 6:
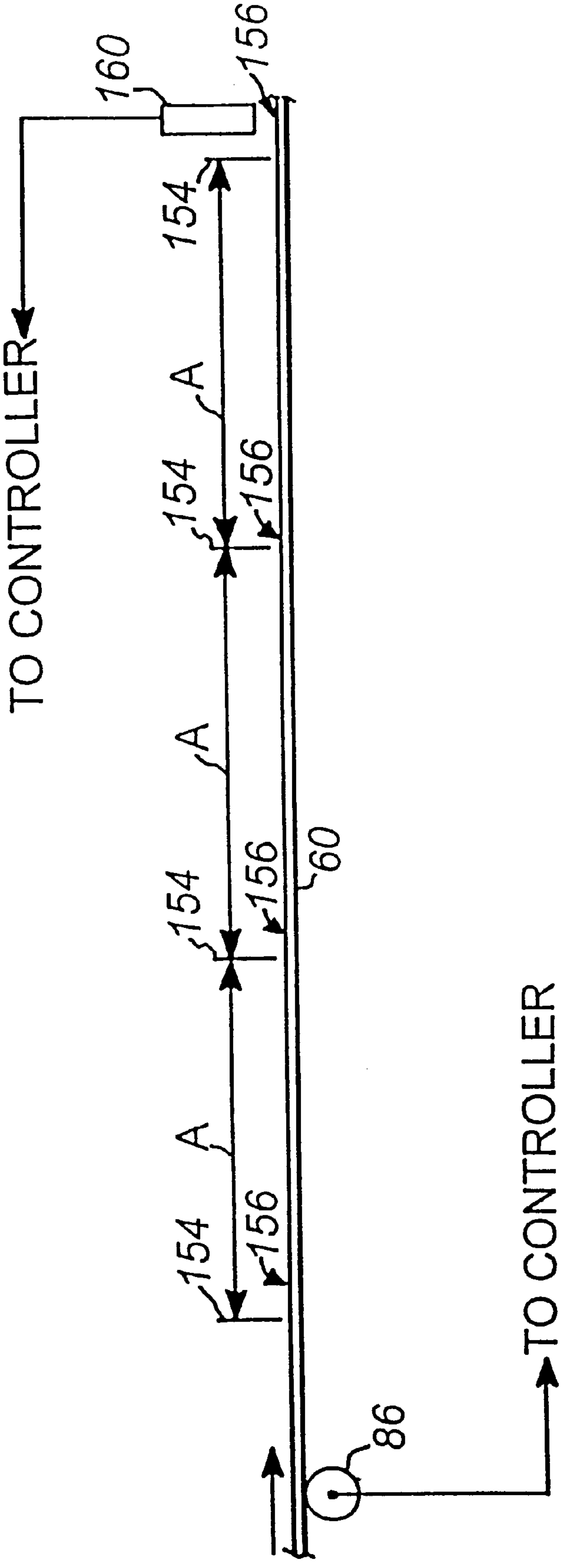
FIG. 6 is a schematic side view of a web registration system according to the preferred embodiment.

With further reference to FIG. 6, the pulses generated by the encoder 86 can be calibrated by the controller 150 to track the passage of the wells length A of web 60 thereover. As long as the web 60 remains synchronized with the image drum 64, a given length A of web bounded by page breaks 154 should pass over the image drum in synchronization with the image delivered thereon. If, however, the length passing over the image drum is greater than or less than A, the web 60 will slowly become offset relative to the printed image. Such offset can be cumulative and radially skew the printing on the web.

As noted, prior art printers avoided much of the problem associated with cumulative offset by using the regularly spaced tractor pin feed holes as a guide that insures alignment of the web with the image drum. However, the pinless drive roller 72 may cause minor web slippage. Thus, to insure the registration of the web 60 relative to the image drum 64 is maintained, regularly spaced preprint marks 156 (FIG. 3) are provided at predetermined intervals along the web. These regularly spaced marks 156 can comprise visible or invisible marks. It is necessary only that the marks be sensed by some accepted sensing mechanism. For example, infrared or UV sensitive marks can be utilized. Similarly, notches or perforations can be utilized as marks. The marks can be spaced relative to each page break or at selected multiples of page breaks, so long as the marks are spaced in a predictable pattern that indicates a relative location on the web.

A sensor 160, which in this embodiment is an optical sensor, is interconnected with the controller 150 and is programmed to sense for the presence of the preprinted mark 156 at a time that correlates to the passage of page length A through the image transfer drum 64. If the mark 156 is sensed, the current drive roller speed is maintained. However, if the mark is no longer sensed, the speed is increased or decreased until the mark 156 is again sensed for each passage of a page length A of web 60 through the image drum 64.

In operation, the controller 150 continuously receives encoder pulses from the encoder 86. When a number of pulses are received that correlates to a page length A the controller queries the sensor 160 for the presence or absence of a mark 156. Absence of mark, triggers an incremental increase or decrease in drive roller speed until the mark 156 again appears at the appropriate time. In order to insure that any increase or decrease in speed in appropriately made as required, the sensor 160 can be programmed to strobe at, for example, 60 cycles per second to determine the almost exact time of passage of a mark relative to the timing of the passage of a length A of web through the image drum 64. Hence, if the strobed sensor senses that the mark 156 has passed before the passage of a length of web, the drive roller 72 can be instructed speed up. Conversely, if the mark 156 is sensed subsequent to the passage of a length of web through the image drum 64, then the drive roller 72 can be instructed to slow. Since feed using a drive roller 72 according to this embodiment is relatively reliable and slip-free, the speed-up and slow-down functions can occur in relatively small increments (such as a few hundredths or thousandths of an inch per second). An effective method for tracking web is disclosed in applicant's U.S. Pat. Nos. 4,273,045, 4,736, 680 and 5,193,727, the disclosures of which are expressly incorporated herein by reference. With reference to U.S. Pat. No. 5,193,727, a method and apparatus for tracking web utilizing marks on the web is contemplated. These marks enable the determination of page breaks despite the existence of slack in the web.

Figure 7:
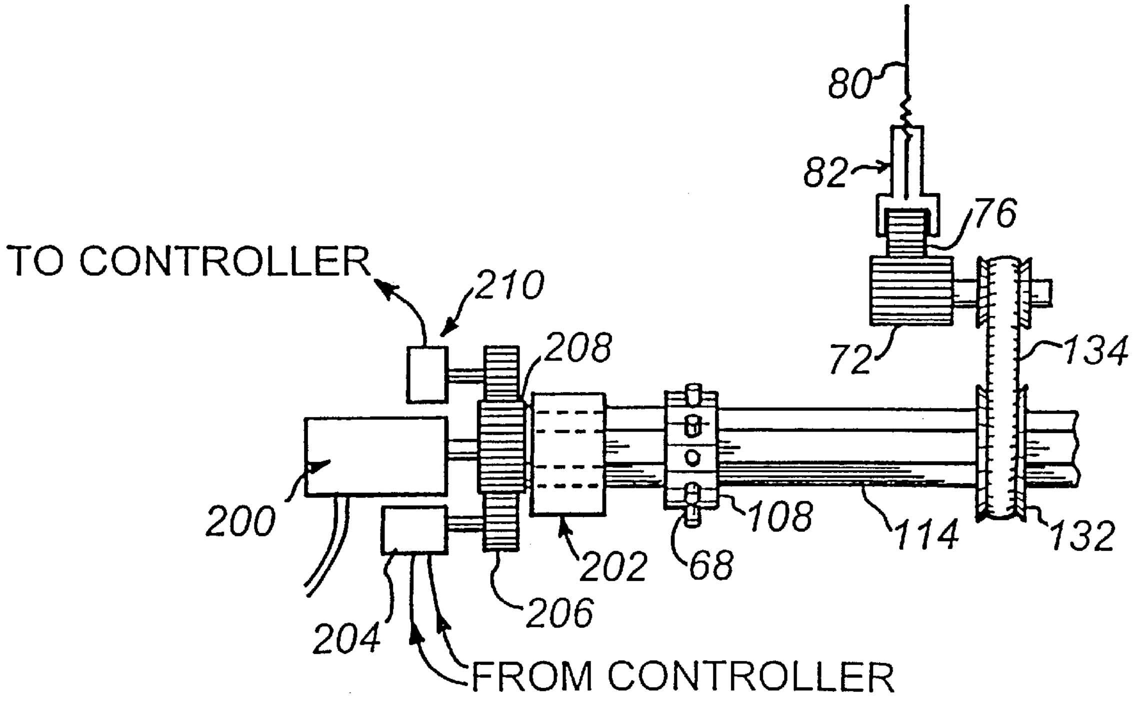
FIG. 7 is a somewhat schematic side view of a registration mechanism according to an embodiment of this invention.

As discussed above, the drive roller 72 can be interconnected with the tractor pin feed drive shaft 114 via a pulley 132 and belt 134 interconnection. FIG. 7 illustrates a registration controller that interacts with the drive shaft 114. Thus, the existing tractor pin feed drive motor and mechanism can be utilized according to this embodiment. The drive feed motor 200 is interconnected with the drive shaft 114 via a differential unit 202 that, according to this embodiment, can comprise a Harmonic Drive differential that enables concentric application of main drive force and differential rotation. Harmonic Drive gearing utilizes inner and outer gear teeth that differ in number. The inner oscillates relative to the outer to provide a slow advance or retard function. Such gearing typically offers ratios of 50:1 to 320:1. Thus, for a given rotation applied by the main motor 200, a relatively small rotational correction can be applied by the differential motor 204. Other forms of differentials are also contemplated. In the illustrated embodiment, the differential drive motor 204 is interconnected by gearing 206 and 208 that is interconnected with the differential 202. The differential motor drive 204, according to this embodiment, receives drive signals from the controller that enable forward and reverse drive of the differential drive motor 204. The differential 202 responds to such forward and reverse drive signals by advancing or retarding the drive shaft relative to the main drive motor 200. Hence, small incremental changes in web location relative to the movement of the image transfer drum can be effected using the differential 202 according to this embodiment.

As previously discussed, signals instructing advance and retard of the main drive roller can be provided based upon the location of predetermined marks on the web relative to the passage of a given length of web through the image transfer drum. Thus, an encoder 210 is interconnected with main drive motor 200 via gear 208. The encoder 210 can comprise the original encoder used with the printer drive mechanism. Similarly, an internal encoder can be provided in the main drive motor 200.

Figure 8:
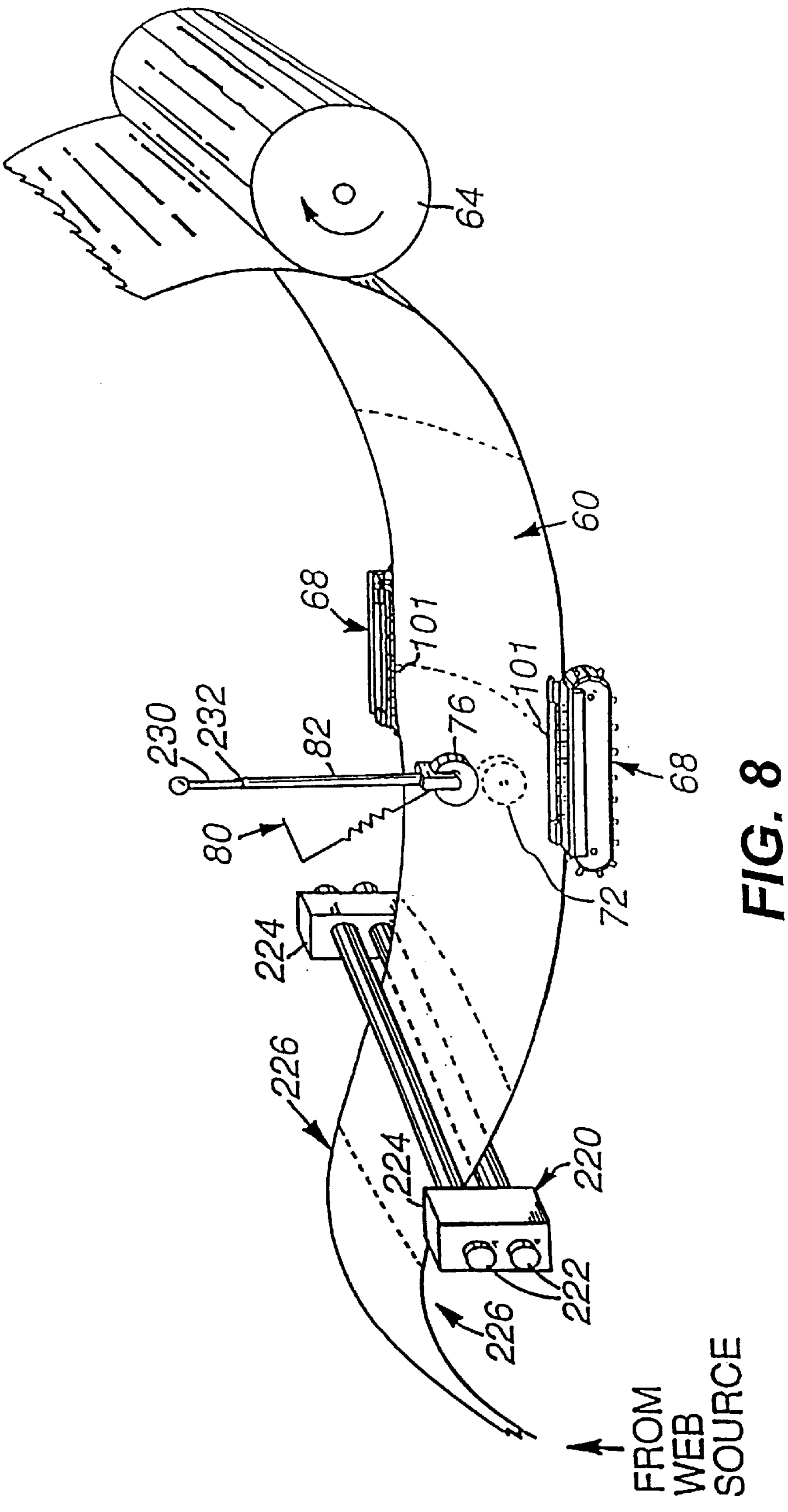
FIG. 8 is somewhat schematic perspective view of an improved guiding system according to this invention.
Figure 9:
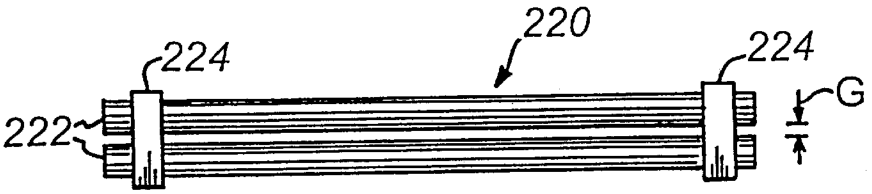
FIG. 9 is a front view of an improved guiding system according to FIG. 8.

A further improvement to the guiding function according to this invention, as illustrated in FIGS. 8 and 9, entails the use of a stiffener bar assembly 220 upstream of the drive roller 72 and upstream tractor pin feed drive element pair 68. The stiffener bar assembly 220 according to this embodiment can be located approximately 3–12 inches from the drive roller 72 and can be mounted on brackets (not shown) that extend from the tractor pin feed drive element 68. The stiffener bar assembly comprises a pair of round cross-section rods 222 having a diameter of approximately ½–¾ inch. The rods 222 are mounted in a spaced-apart parallel relationship on a pair of mounting blocks 224 that are located outwardly of the edges of the web 60. The blocks 224 should be mounted so that clearance is provided for the widest web contemplated. The blocks 224 can be spaced an additional inch or more beyond the edges 226 of the web 60. As detailed in FIG. 9, the blocks 224 separate the rods 222 by a gap G that, according to this embodiment, is approximately 0.015 inch. Hence, the gap G is sufficient to allow passage of most thicknesses of web therebetween, but allows little play in the web 60 as it passes through the bars 222. The bar assembly 220 thus aids in the prevention of buckling of the web 60 as it is driven to the drive roller 72.

According to this embodiment, the web 60 is threaded through the bars 222 upon loading since the bars are fixed relative to each other. It is contemplated that rod pair can be employed to facilitate loading and to accommodate different thickness of web.

Note that loading of web into the system is also facilitated by a handle 230 located upwardly of the pivot axis 232 of the follower roller bracket 82. The handle enables the user to move the follower roller 76 out of engagement with the upper side of the web 60 to facilitate loading. As discussed above, the overlying plates 101 of the tractor pin feed drive element 68 can also be lifted to allow the web to be positioned onto the tractor pin feed drive element 68.

Figure 10:
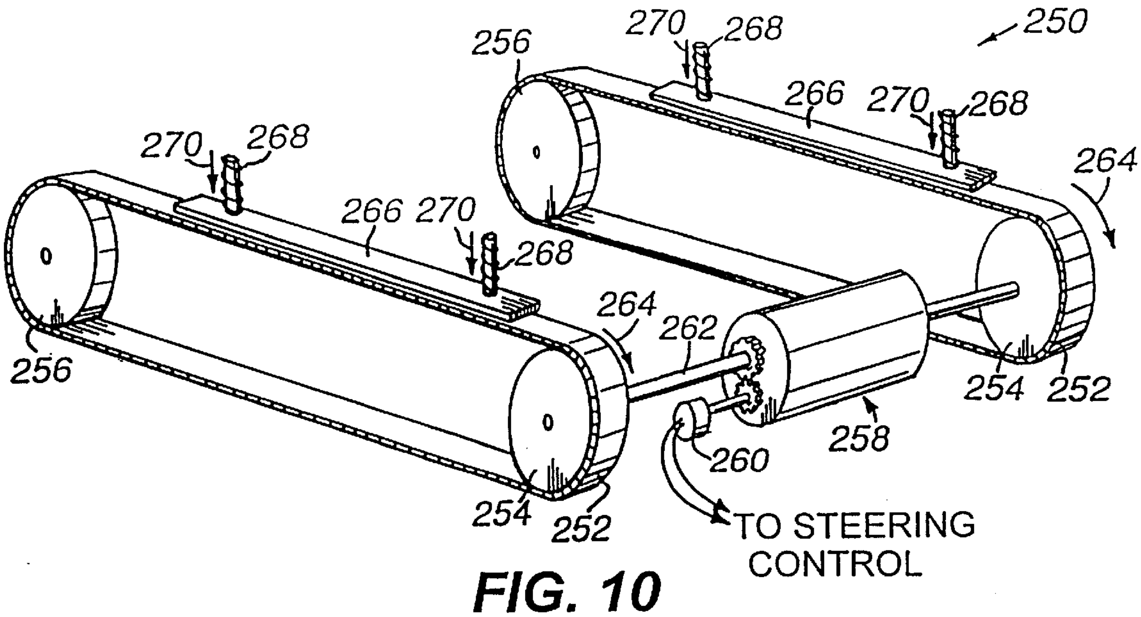
FIG. 10 is a somewhat schematic perspective view of an alternate embodiment of a web driving and guiding mechanism according to this invention.

It is further contemplated, according to this invention, that the driving and guiding functions can be combined into a single drive/guide unit. FIG. 10 illustrates a driving and guiding unit 250 that comprises a pair of elastomeric belts 252 that are, in this embodiment, fitted over the rollers 254 and 256 of the tractor feed drive elements found in a conventional utilization device. It is further contemplated that the tractor feed pin belts can be retained (not shown) and that the elastomeric belts 252 can be positioned directly over these tractor pin feed belts.

While guiding can still be provided by a separate structure, it is contemplated that, according to this embodiment, a steering differential drive assembly 258, such as the harmonic drive described above, having a differential drive motor 260, is employed in conjunction with the belt drive shaft 262. Thus, the belts are normally driven in synchronization in the direction of the arrows 264 but s application of rotation by the differential drive motor 260, in a predetermined direction, causes the belts to move differentially relative to each other to effect steering of a driven web.

According to this embodiment, a respective pressure plate 266 is located over each of the belts 252. The pressure plates include springs 268 that generate a downward force (arrows 270) to maintain the web (not shown) in positive contact with the belts. The pressure plates can comprise a polished metal or similar low friction material. It is contemplated that the conventional tractor pin feed plates described above can be adapted to provide appropriate pressure against the belts 252. Alternatively, the plates can be used as mounting brackets for supplemental pressure plates such as the plates 266 described herein.

Figure 11:
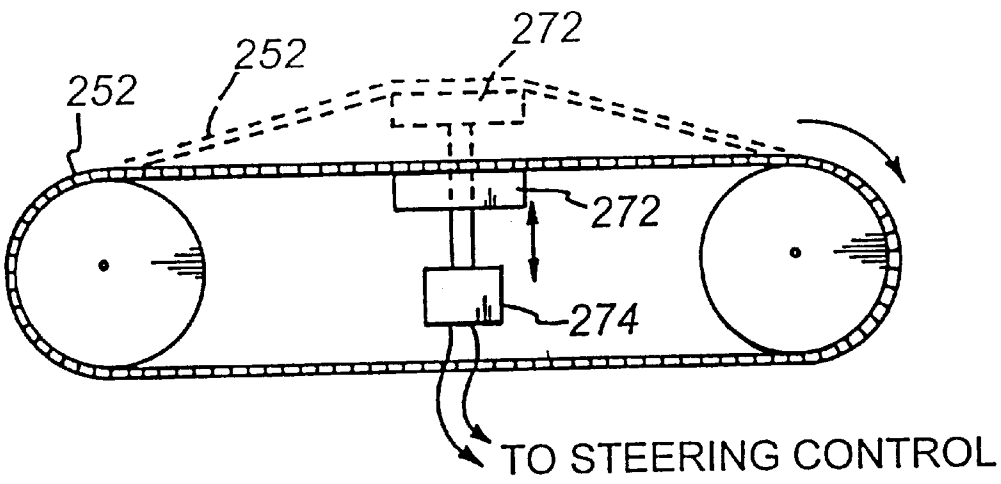
FIG. 11 is another alternate embodiment of a driving and guiding element according to this invention.

FIG. 11 illustrates an alternate steering mechanism according to this invention. An extendible pressure plate 272 shown in both retracted and extended (phantom) positions causes the belt 252 to flex (phantom). The pressure plate is controlled by a linear motor 274 that can comprise a solenoid according to this embodiment and that is interconnected with steering controller (not shown). By stretching the belt 252. it is momentarily caused to move faster which forces the edge of the web (not shown) in contact with the belt 252 to surge forwardly further than the opposing belt (not shown) that has not stretched. In this manner, steering of the web can be effected by selective application of stretching force to each of the opposing belts.

Figure 12:
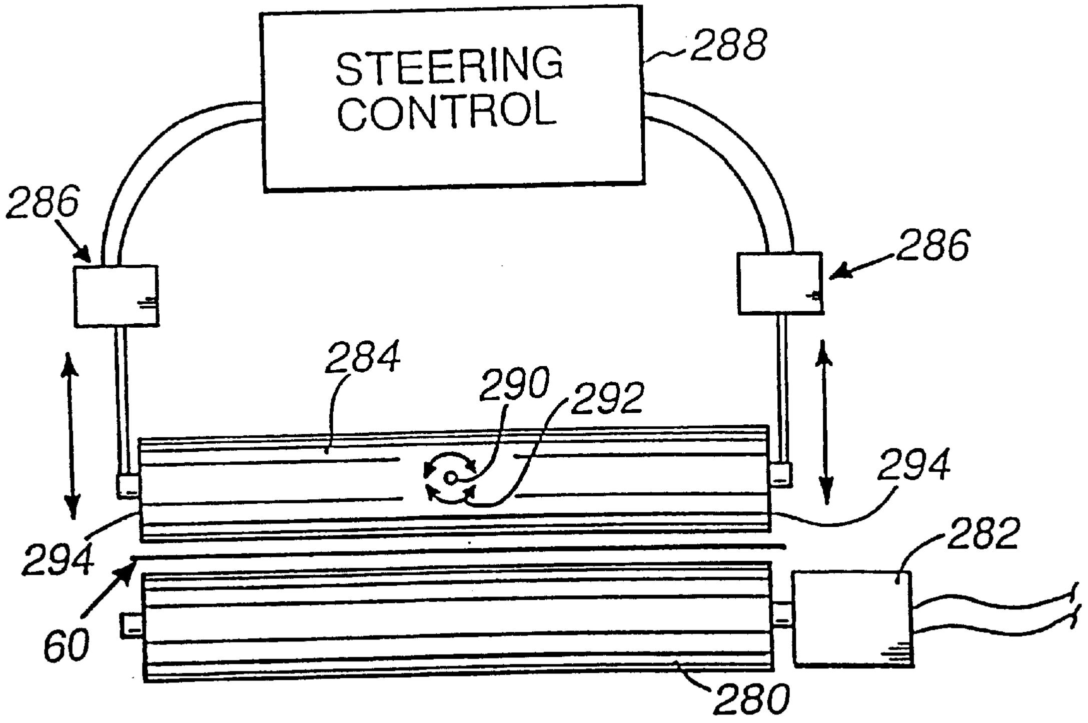
FIG. 12 is another alternate embodiment of a driving and guiding mechanism according to this invention.

FIG. 12 illustrates yet another embodiment for accomplishing the driving and guiding function according to this invention. It is contemplated that the web 60 can be driven by a full width drive roller 280 driven by a drive motor 282. Such a roller 280 can comprise an elastomeric material that changes diameter based upon application of force. A full-width follower roller 284 can be located on opposing side of the web 60 from the drive roller 280. The follower roller can also comprise an elastomeric material or a harder substance such as polished metal. The drive roller 284 according to this embodiment is mounted on movable supports 286 that are interconnected with a steering controller 288. The supports 286 enable the follower roller 280 to pivot approximately about the axis 290 (curved arrow 292) so that opposing ends 294 of the roller 284 can be brought into more-forcible contact with the drive roller 280. Hence, the diameter of the drive roller 280 at a given end can be altered and the drag force generated between the drive roller 280 and follower roller 284 can be increased at a given end. The increase in drag and/or decrease in diameter cause the web to change direction as it passes through the drive and follower rollers 280 and 284, respectively. Thus, a full length roller can be utilized to positively steer the web 60 relative to the utilization device element.

In each of the foregoing embodiments, it is contemplated that the steering controller directs steering of the web 60 to align the web relative to the utilization device element. Such alignment ensures that the utilization device element performs its operation (such as printing) on the web at the desired location relative to the web's width-wise edges. As illustrated above, it should be clear that driving and guiding can be accomplished, according to this invention, at a single point along the web, along the entire width of the web, or at the edges of the web. The driving and guiding components described herein can be provided as an integral unit or can be divided into separate units that are located approximately adjacent, or remote from each other along the web's path of travel.

It is contemplated that the pinless web feed system according to this invention can be used selectively so that standard tractor pin feed web can still be utilized when desired. Hence, all components of the pinless feed system can be located out of interfering engagement with the tractor pin feed drive elements and all sensors used by the pinless feed system can be deactivated or switched back to a standard tractor pin feed drive mode. For example, a hole sensor can be retained and selectively connected to the utilization device's main controller to effect registration when desired. Additionally, as discussed above, the follower roller 76 can be moved out of interfering engagement with the upper side of the web 60 to enable the tractor pin feed drive elements 68 and 70 to effect drive of the web 60.

II. High-Volume Laser Printer Drive Adaptations

Figure 13:
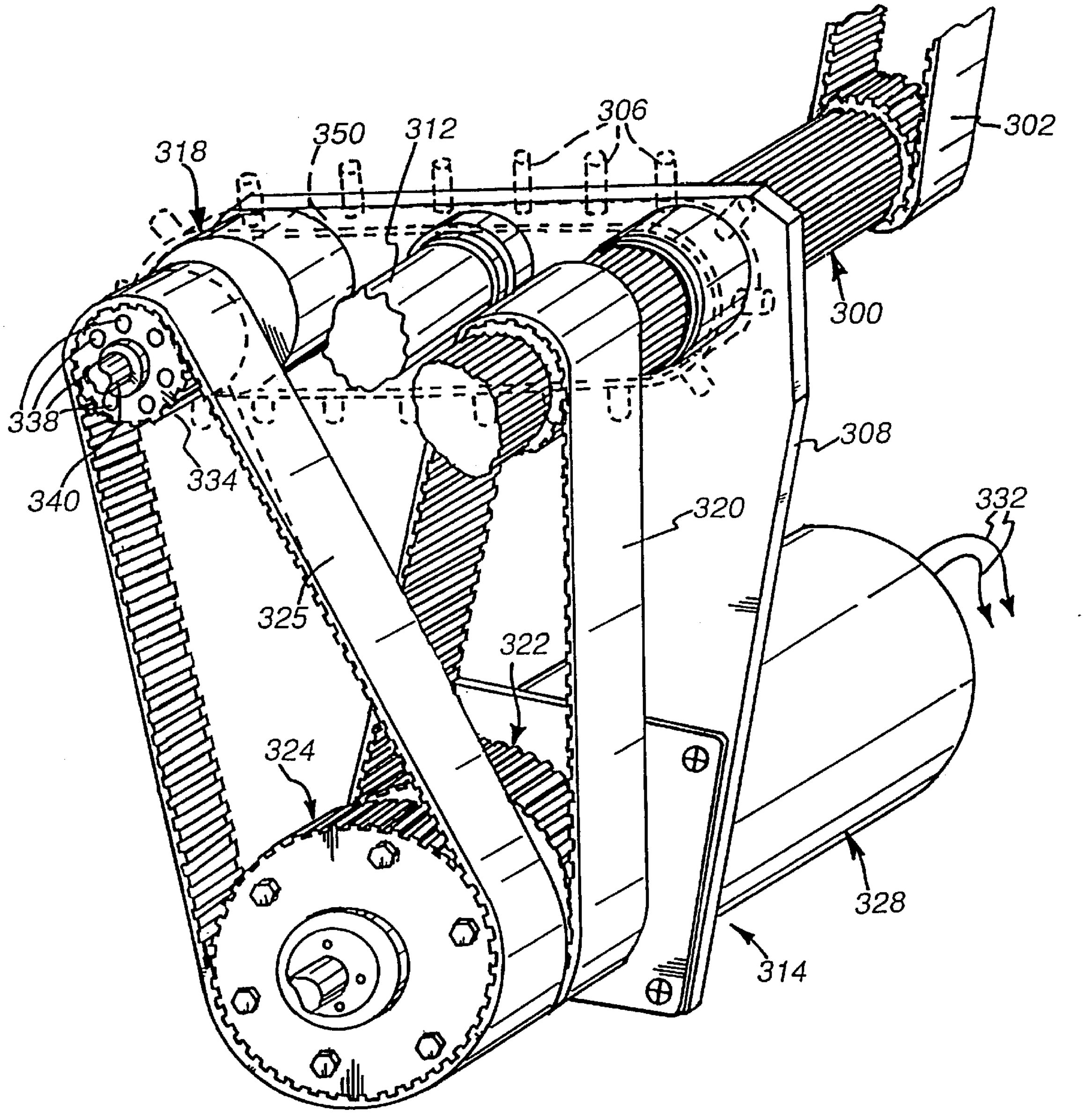
FIG. 13 is a partial perspective view of a registration drive system according to another embodiment of this invention.
Figure 14:
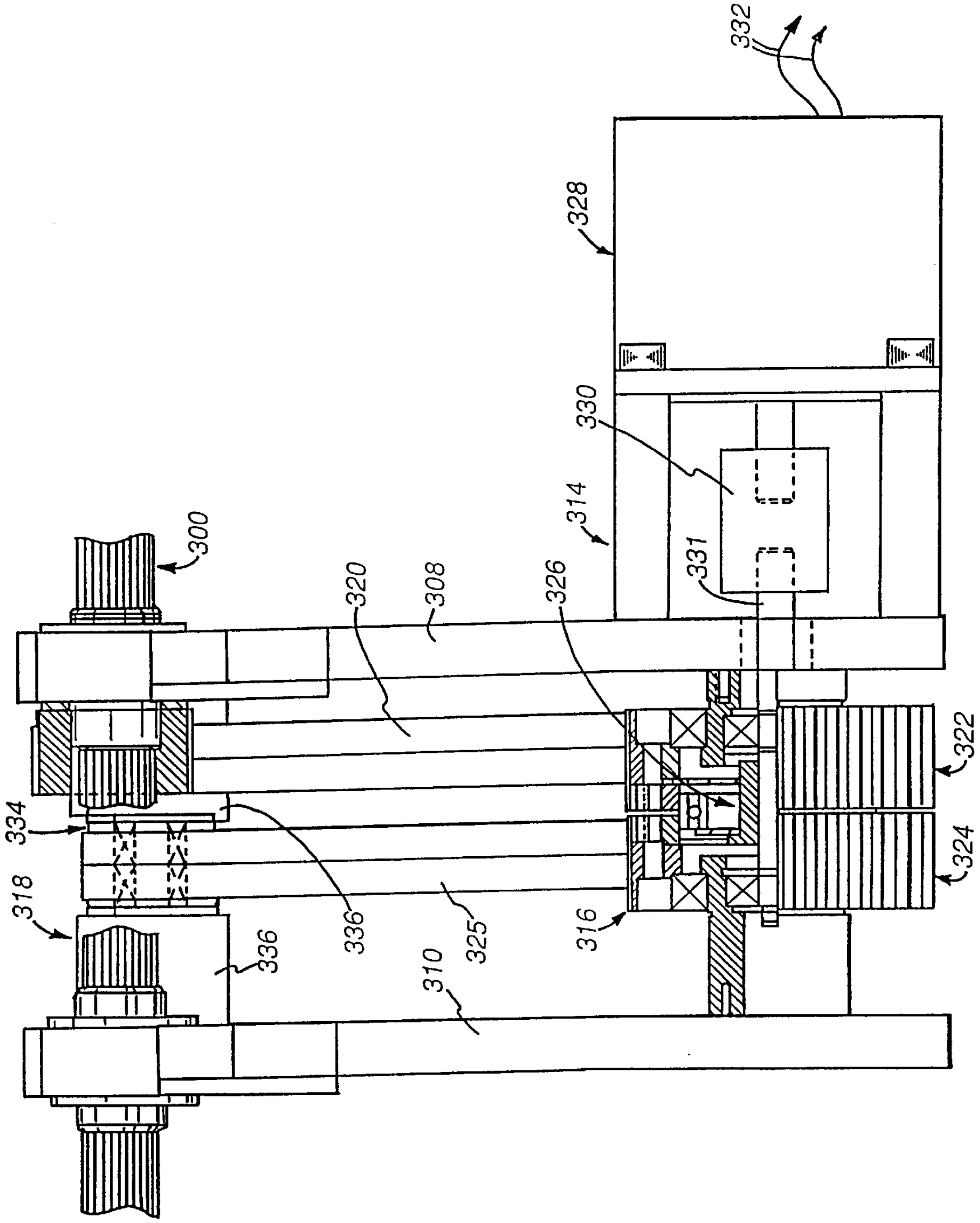
FIG. 14 is a partially exposed front view of the registration drive system of FIG. 13.
Figure 15:
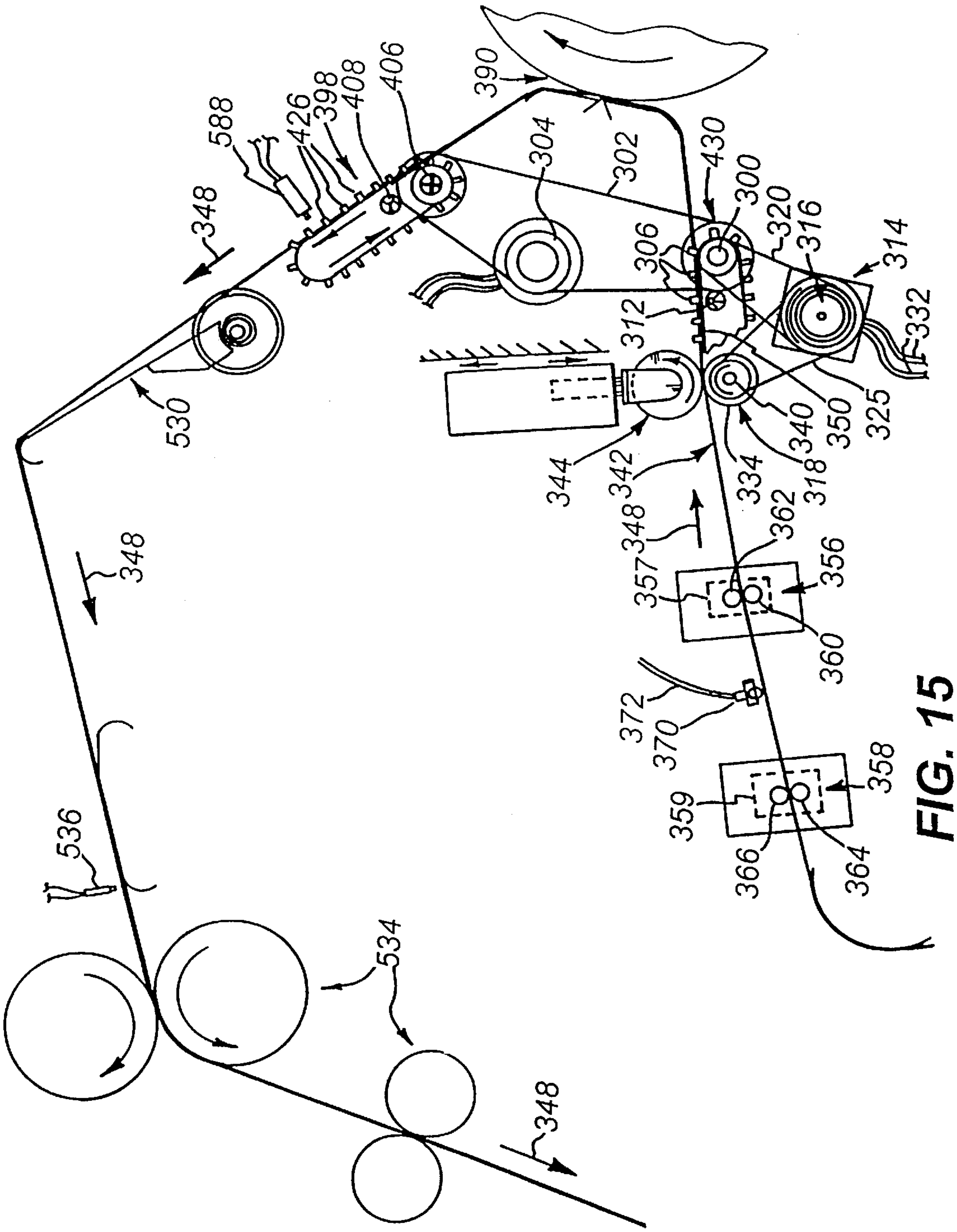
FIG. 15 is a somewhat schematic side view of the drive system according to the embodiment of FIG. 13 illustrating the web path of travel.

A registering drive assembly that is particularly suited to a pinless feed system installed in an IBM-type printer as described above, including the 3900™ series is detailed in FIGS. 13, 14 and 15 The existing pin feed drive spline shaft, the shaft 300 is connected by a timing belt 302 to a central drive motor 304 (FIG. 15). In this embodiment, the shaft 300 continues to drive tractor pins 306 in a normal manner. Support brackets 308 and 310 have been added and are supported by the splined shaft 300 and an existing guide shaft 312. The support brackets, in this embodiment can comprise plates formed from aluminum, steel or another metallic or synthetic material. At the lower end of the brackets 308 and 310 is positioned the registration drive system 314 according to this embodiment. As described above, the registration system according to an embodiment of this invention utilizes a harmonic drive differential assembly 316 that regulates the transfer of power from the shaft 300 to the web drive roller 318. A timing belt 320 extends from the shaft 300 to a driven timing gear 322 in the registration system 314. Another timing belt 325 extends from a driving timing gear in the registration system 314 to the drive roller 318. The harmonic drive differential assembly 326, shown generally in cross-section in FIG. 14 interconnects the driven timing gear 322 and the driving timing gear 324. The driving timing gear 324 is driven at a slight differential (80:81 in this example) and, thus, the diameter of the drive roller 318 or the diameter of the central drive hub 334 (described below) is adjusted so that it provides a tangent of velocity that is approximately equivalent to the linear velocity of the tractor pins 306. A registration motor 328 which, in this embodiment can comprise a stepper motor or a servo, as connected by a coupling 330 to the input shaft 331 of the harmonic drive. By powering the motor in a forward or reverse direction, advance and retard motions can be provided to the drive wheel 318 relative to the drive shaft 300. The motor 328 is controlled through power inputs 332. They are interconnected with the central processor of this invention. The harmonic drive advances or retards one revolution for approximately 100 revolutions of the motor 328 according to this embodiment.

With reference to the drive roller, the belt 325 engages a central drive hub 334 with appropriate timing grooves. The ½ inch axial length central hub is provided with a smaller diameter than the adjacent drive surfaces 336. These drive surfaces can be serrated or bead blasted for providing further friction. The outer surface has a diameter of 1¼ inches in this embodiment. Overall axial length of the roller 318 is approximately 2 inches. The diameter of the hub is smaller and, typically, is chosen to provide appropriate tangent of velocity to the driving surfaces 336. A set of through holes 338 (FIG. 13) can be provided coaxially about the center of the roller. These holes 338 aid in lightning the roller for greater acceleration from a stop. The roller is supported on a shaft 340 between the support plates 308 and 310 at a position upstream of the drive shaft 300 and support bar 312. As detailed in FIG. 15, the roller 318 engages the web 342 under the pressure of an idler roller 344. The idler roller is spring loaded to provide a relatively constant pressure, thus forming a nip between the idler roller 344 and the drive roller 318. The idler roller can be constructed from an elastomeric material, a synthetic material such as Delrin® or, preferably, of a metal such as aluminum and can have a larger diameter than the drive roller 318. It typically contacts the driver roller along its entire axial length. In this embodiment, the registration and drive roller system are located between the two tractor pin feed units, adjacent the inboard most unit. In other words, adjacent the tractor pin feed unit on the left taken in a downstream direction (arrow 348 in FIG. 15).

As also noted above, the engaging surfaces 336 of the driver roller 318 can be located slightly above or below the plane of the tractor pin feed belts 350 to provide a desirable trough-shape to the input web 342 for enhanced guiding. In this embodiment, guiding of the web 342 into the drive roller 318 is facilitated by pairs of parallel stiffer bars 356 and 358 located upstream of the drive roller 318. The pairs 356 and 358 of bars each include individual parallel bars 360, 362 and 364, 366, respectively that are spaced from each other a few thousandths of an inch. The exact spacing should be sufficient to allow the largest thickness web to be contemplated to pass easily without excessive friction. The pairs 356 and 358 of bars are located approximately in line with the drive wheels so that they define between the upstream most pair of bars 358 and the drive roller 318 in approximately straight upwardly-sloping path in this embodiment. It has been determined that such a path is desirable in ensuring reliable feeding and formation of a guidable web. These bar pairs 356 and 358 can include movable stops 357 and 359 respectively (shown in phantom) for differing width webs. The bar pairs 356 and 358 are described further below. The bars 360, 362, 364 and 366 can be ¼ inch in diameter in one embodiment. They can be bowed to generate a desirable trough shape in the web.

Figure 21:
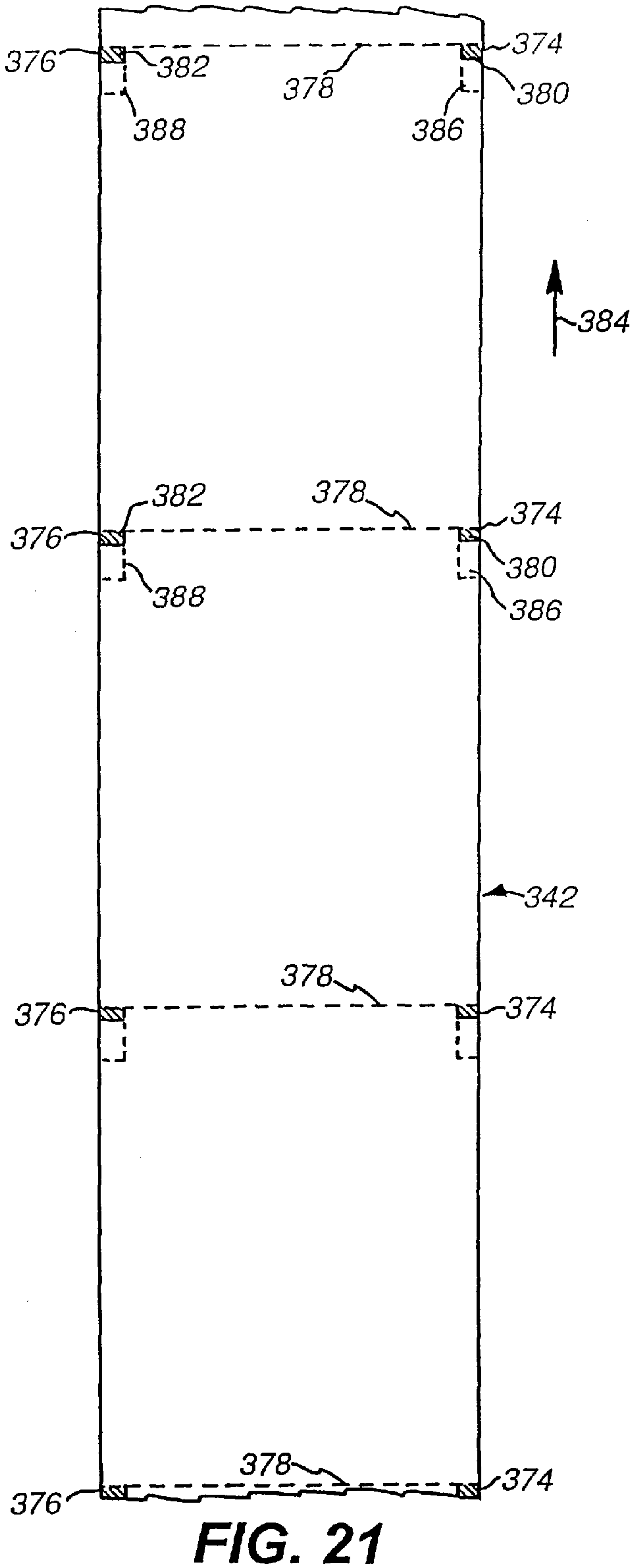
FIG. 21 is a plan view of a plurality of web sections illustrating timing mark locations and sizes according to this invention.

As described above, registration according to this invention is controlled by determining the relative progress of the web 342 through the printer. A fixed point which, in this embodiment, is between the two bar pairs 356 and 358 is chosen to scan for marks on the web. An optical sensor 370 interconnected by a cable 372 to the central processing unit (not shown) is utilized. The marks can comprise perforations, printing or any other readable formation on the web that occurs at known intervals. With reference to FIG. 21, a continuous web 342 is shown with marks 374 and 376 located on either side of the web. These marks can be applied prior to input of the web 342 into the printer. In this embodiment, they have provided adjacent the top of each page near a page break 378. Marks need not be provided adjacent each page break and can be provided at other locations along a given page or section of the web 342. Likewise, marks need only be applied to one side or the other of the web 342. Similarly, the mark can be applied remote from an edge of the web along some portion of the midsection of the web. In this embodiment, each mark 374 or 376 includes a darkened area 380 or 382. This darkened area, in a preferred embodiment has a width (taken in a direction transverse to a direction of web travel as shown by arrow 384 of approximately 0.1 inch and a length, (taken in a direction of web travel as shown by arrow 384) of approximately 0.060 inch. Upstream of each mark is a no-print zone 386 and 388 shown in phantom. The printer is, typically, instructed to locate no print at this area to ensure that the mark is properly read. In a preferred embodiment, marks 376 located along the left edge of the web are utilized. Location of the mark sensor 370 is described further below.

Figure 16:
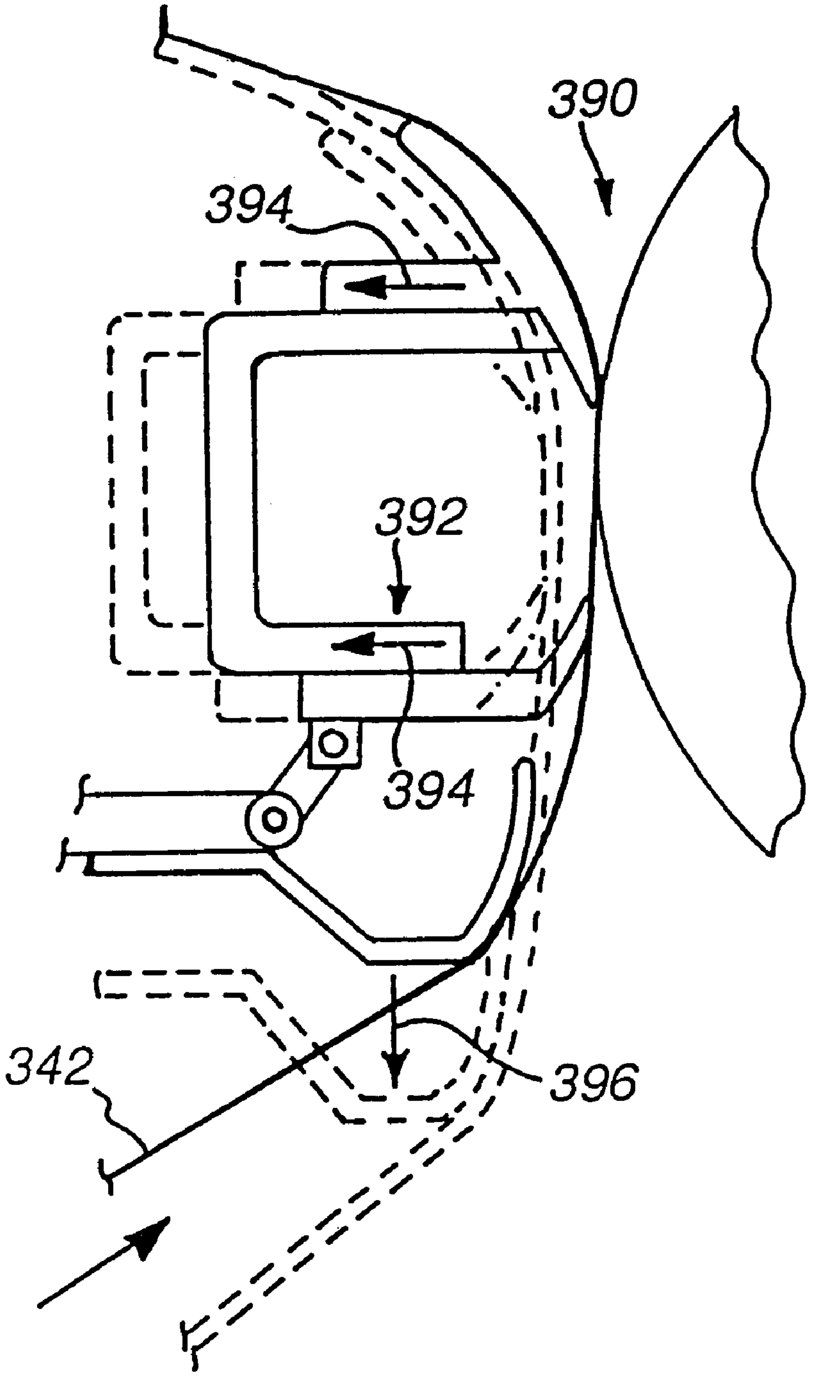
FIG. 16 (PRIOR ART)
FIG. 16 is a somewhat schematic side view of a web retraction system utilized in IBM-type printers according to the prior art.
Figure 17:
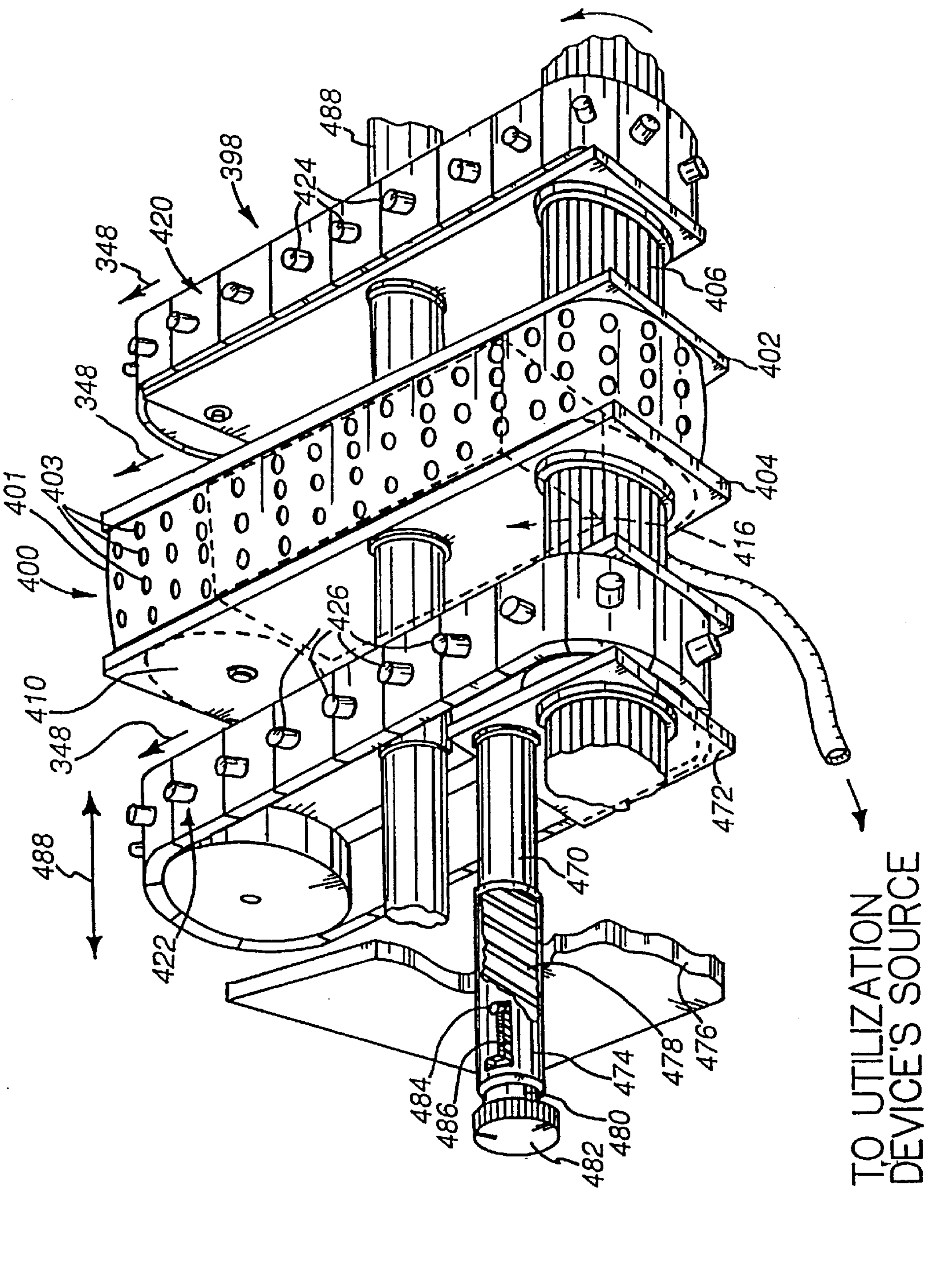
FIG. 17 is a partial perspective view of the upper tractor pin feed mechanism including a vacuum drive belt according to the embodiment of FIG. 13.
Figure 18:
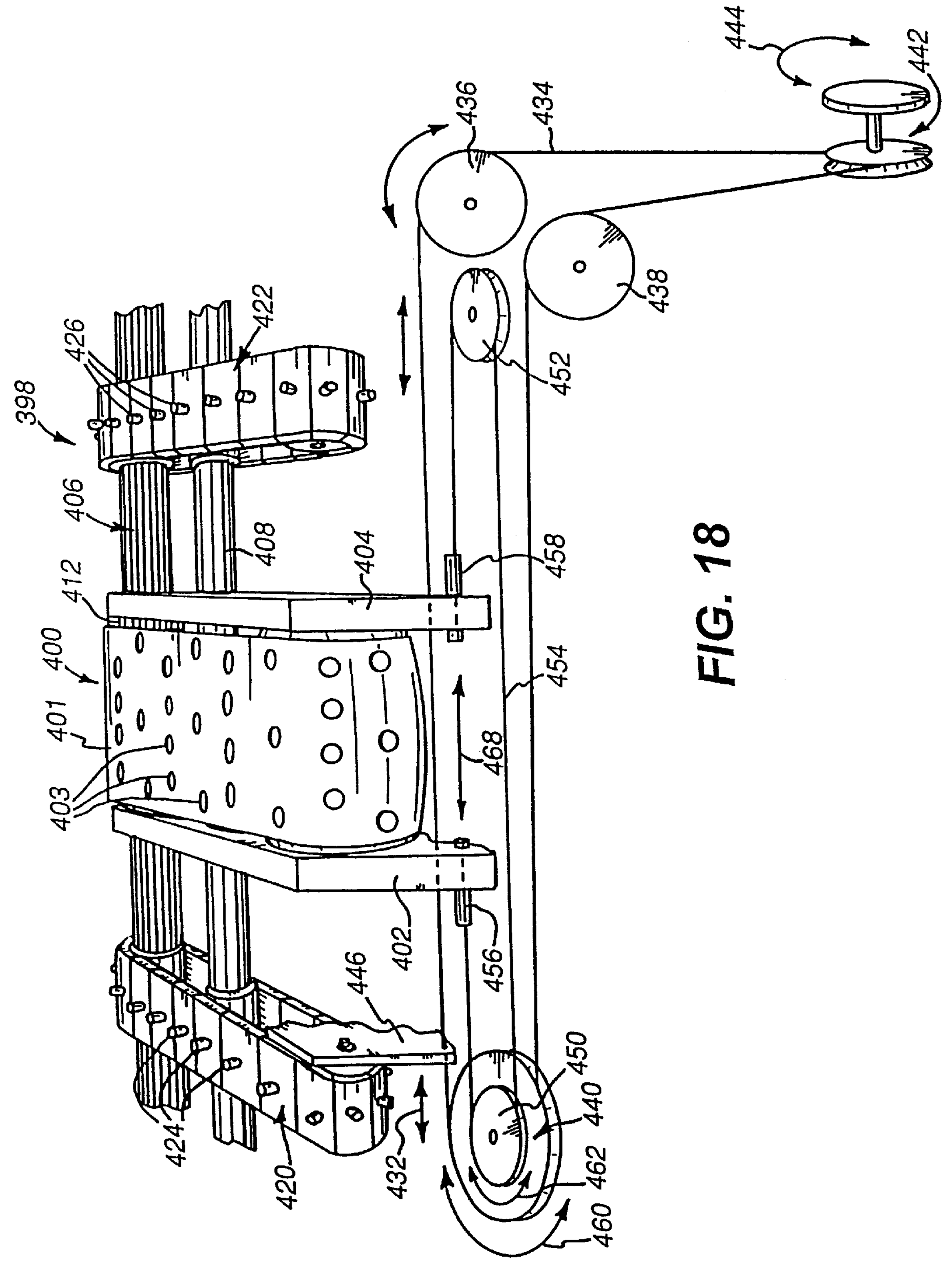
FIG. 18 is a partially exposed front perspective view of the upper tractor pin feed system of FIG. 17.

With further reference to FIG. 15, the web 342 is guided from the drive roller 318 to the image drum assembly 390. With reference to FIG. 16, the IBM series printer typically includes a web retractor mechanism 392 that is generally instructed, by the printer's internal control logic, to move away (arrows 394 from the image drum 390 to a retracted position) (shown in phantom). Simultaneously, a lower retractor moves downwardly, arrow 396 to remove slack in the web 342 as shown in phantom. According to the control logic of the IBM series printer, retraction movement occurs just prior to completion of a printing job. It has been recognized that without the stabilizing influence of the tractor pin feeds at the upper tractor pin feed assembly 398 (in FIG. 15), the retractors will cause the web to misalign roller to the image drum 390 prior to the completion of printing, causing a blurred image. FIG. 17 and 18 illustrate a vacuum belt assembly 400 for use in conjunction with the upper tractor feed assembly 398. The vacuum belt assembly 400 is mounted between a pair of support plates 402 and 404 that are rotatably fixed to the splined drive shaft 406 and the central support bar 408 of the existing tractor feed assembly 398. The vacuum belt in this embodiment comprises a perforated neoprene belt having a width of approximately 2 ½ inches and a series of perforations 403 of approximately ¼ inch. A slight radius or crown is provided to the front idler roller 410 (shown in phantom in FIG. 17) to maintain alignment of the belt. The driving roller 412 can be cylindrical in this embodiment and can include knurling to ensure that a positive force is transferred to the belt 401.

Within the frame plates 402 and 404 is provided a sealed vacuum box 416 (shown in phantom). The vacuum box is open at its top and in communication with the perforations 403. The surface of the belt 401 can be located so that it forms a slight trough or a slight arch in the web relative to the tractor pin feed belts 420 and 422. When the web 342 engages the vacuum belt, the frictional surface of the vacuum belt, in combination with the vacuum, directed through the perforations, causes the web to hold fast relative to the upper tractor feed assembly 398. Only movement of the tractor feed assembly via the drive shaft 406 is permitted. Accordingly, the vacuum belt assembly 400 takes the place of an interengagement between pins 424 and 426 and pin holes (not shown) on the web in the pinless feed embodiment according to this invention.

In order to accommodate different widths of web, the upper and lower tractor pin feed units 398 and 430, respectively, include at least one tractor pin feed belt assembly that is movable along their respective splined drive shaft and central supporting shaft. Movement of the upper tractor pin feed assembly 398 is described in FIG. 18, but a similar movement mechanism is utilized with reference to the lower tractor pin feed assembly. With reference to the downstream direction (arrow 348) the left, or closest tractor pin assembly belt 422 remains relatively fixed. The far tractor pin feed belt 420, however, is movable along the splined drive shaft 406 and supporting shaft 408 toward and away from the opposing tractor pin feed belt 422 as illustrated by the double arrow 432. This movement is controlled by a control cable 434 that is supported by pulleys 436, 438 and 440 and moved by rotating a control wheel and pulley assembly 442. Moving the control wheel and pulley assembly 442 in each of opposing directions (curved arrow 444) causes movement of the tractor pin feed belt 420 in each of opposing directions (arrows 432). The cable 434 is fixedly connected to a portion of the tractor pin feed belt frame 446 allowing linear motion of the cable 434 to be translated into movement of the tractor pin feed belt assembly 420. A second concentric pulley 450 and a corresponding opposing idler pulley 452 are provided with an inner cable 454 that is fixedly connected to the sides of the side plates 402 and 404 of the vacuum belt assembly 400. One or more turnbuckles 456 and 458 can be provided to maintain an appropriate tension in the inner cable 454. Movement of the main control cable 434 causes the pulley 440 to rotate (double curved arrow 460) which, in turn, rotates (double curved arrow 462) the inner concentric pulley 450, assuming that the inner cable 454 is sufficiently taut and that an appropriate friction between the cable 454 and the pulley 450 is maintained, the cable will move, causing the vacuum belt assembly 400 to move (double arrow 468) in conjunction with the tractor pin feed belt assembly 420. The diameter of the inner concentric pulley 450 is half the diameter of the outer main pulley 440. Accordingly, the movement of the inner cable 454 will be exactly half that of the corresponding movement of the outer cable 434. Thus, the vacuum belt assembly moves only one half the distance moved by the tractor pin feed assembly 420. In this manner, the vacuum belt assembly 400 maintains an alignment that is approximately centered relative to each of the opposing tractor pin feed belt assemblies 420 and 422 at all times. Such a drive mechanism adjustment system can be provided to the lower drive wheel 318 and its associated registration system.

Both the upper tractor pin feed assembly 398 and the lower tractor pin feed assembly 430 include fixed tractor pin feed belts that are typically not movable in the original printer. In order to insure that printing on the image drum is properly centered, it is desirable to move the fixed tractor pin feed belt inwardly toward the opposing tractor pin feed belt. The absence of tractor pin feed strips which, typically, are one half inch in width would, otherwise, cause a pinless web to be misaligned by approximately half that distance, or, one eighth inch. This is because the unperforated edge, when resting against the pins is moved inwardly one eighth inch more than it would normally be positioned if a web containing pinholes were engaged by the pins. Accordingly, both the upper and lower fixed tractor pin feed belts have been made movable over a small distance. Referring to FIG. 17, a shaft 470 has been attached to the side plate 472 of the tractor pin feed belt 422. Any stops that would prevent the tractor pin feed belt from moving relative to, for example, the central rod 408, have been removed. Thus, tractor pin feed belt assembly 422 would be free to move on the drive shaft 406 and central shaft 408 but for the intervention of the rod 470. The rod 470 engages a collar or housing 474 that is fixed to the frame of the printer 476. A spring 478 can be used to bias the rod 470 relative to the housing 474. By rotating a shaft 480 having a control knob 482 and a stop 484. that rides in a two position slot 486, the operator can select between two positions (double arrow 488) that represent a pinless feed and a pin feed position. The pin feed position is the normal fixed position for the tractor pin feed belt 422, while the pinless feed position is a location inwardly toward the opposing tractor pin feed belt 420, approximately $\frac{1}{10}$–$\frac{1}{8}$ inch.

The adjustment knob 42 allows for quick change between pinless and pin feed operation. As noted below, a similar adjustment knob can be provided to the lower pin feed assembly 430.

Figure 19:
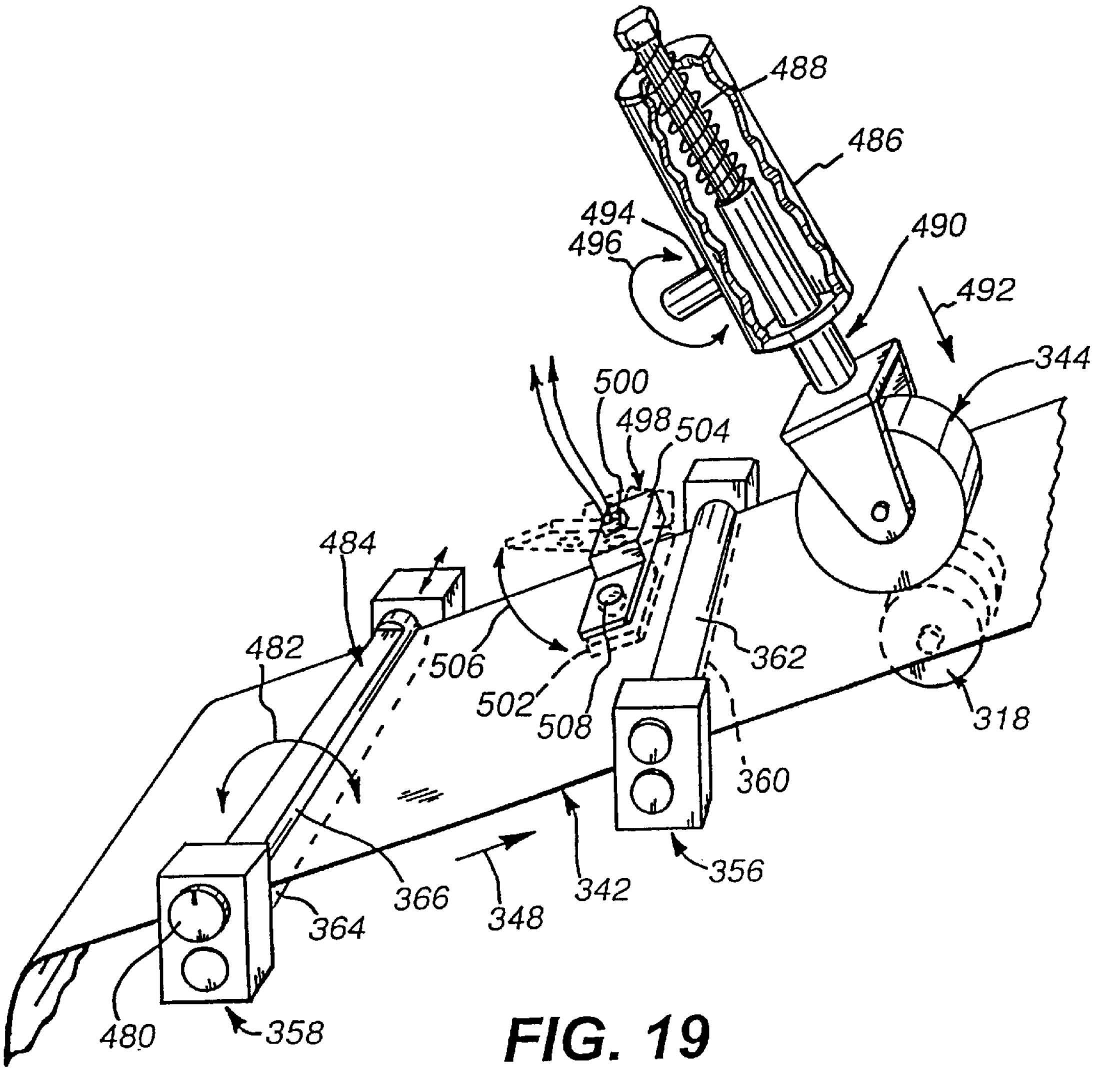
FIG. 19 is a partial perspective view of the web path adjacent the drive roller, detailing a mark sensor according to one embodiment.
Figure 20:
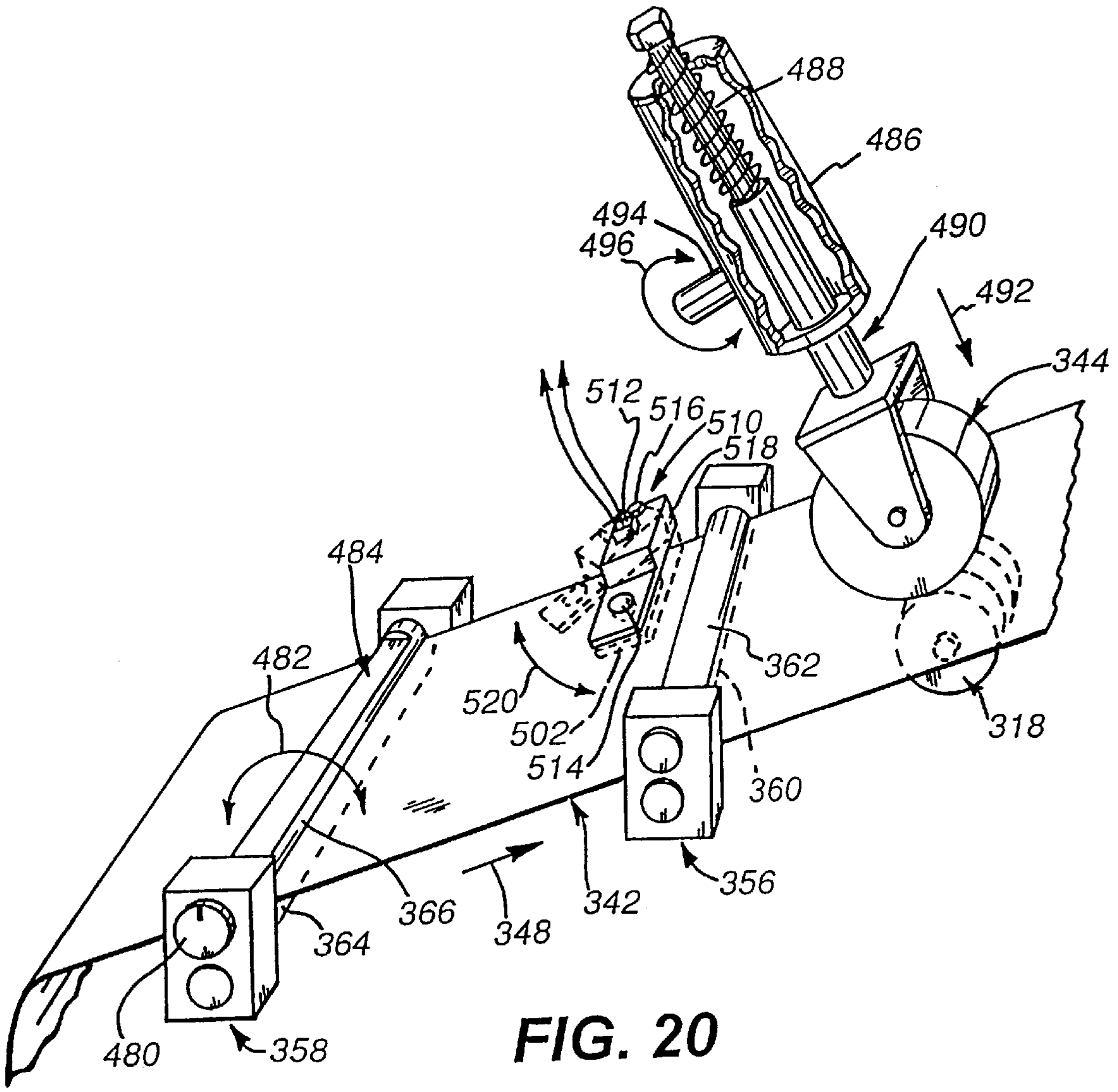
FIG. 20 is a partial perspective view of the web path adjacent the drive roller, detailing a mark sensor according to another embodiment.

Reference is made to FIGS. 19 and 20 which show, in more detail, the alignment of the stiffener bar pairs 356 and 358 in the engagement of the idler roller 344 with the drive roller 318. In this embodiment, the upper stiffener bar 366 of the upstream stiffener bar pair 358 includes a control knob 480 that enables the bar 366 to rotate (curve arrow 482) to selectively present a flat surface 484 adjacent the web 342. The flat surface 484 is located opposite the web 342 during loading to provide a larger gap for easier threading of the web through the stiffener bar pair 358.

The idler roller in this embodiment is provided within a housing 486 in which a spring 488 biases the idler roller bracket assembly 490 against the drive roller 318 (arrow 492). The pressure of the spring is set at a few pounds, but it can be varied within a relatively wide range depending upon the type of surfaces used for the idler roller 344 and drive roller 318. For a hard steel or aluminum drive and idler roller, a few pounds of pressure should be sufficient to form an appropriate driving nip. The exact amount of pressure can be determined on a trial and error basis.

The housing 486 can be provided with a pivot 494 that enables a small range of rotation (curved arrow 496) about an axis aligned with the direction of web travel (arrow 348). Pivotally mounting the idler roller insures that it presents a flat, fully contacting surface against the drive roller 318.

FIG. 19 illustrates one embodiment of a mark sensor 498 according to this invention. The mark sensor overlies the web 342 in a position that enables an optical sensing element 500 to scan for pre-printed marks. As noted above, these marks enable control of registration. A platen 502 (shown in phantom) is provided beneath the web 342 so that the web is supported adjacent the mark sensor. The upper portion 504 of the mark sensor 498 can be hinged (curved arrow 506) away from the web (as shown in phantom) for ease of loading the web. The upper portion 504 can include a roller ball bearing or similar weighted roller 508 that maintains the web securely against the platen, thus insuring that an accurate reading of marks is obtained. In an alternate embodiment of a mark sensor 510, illustrated in FIG. 20, the optical sensor 512 also scans for marks and a roller bearing 514 is utilized. In this embodiment, a pivot point 516 is provided so that the upper portion 518 of the sensor 510 can rotate (curved arrow 520) within the plane of the web 342, out of contact with the web. Partial displacement of the sensor upper portion 518 is shown in phantom.

III. Sensor Adaptations

Figure 22:
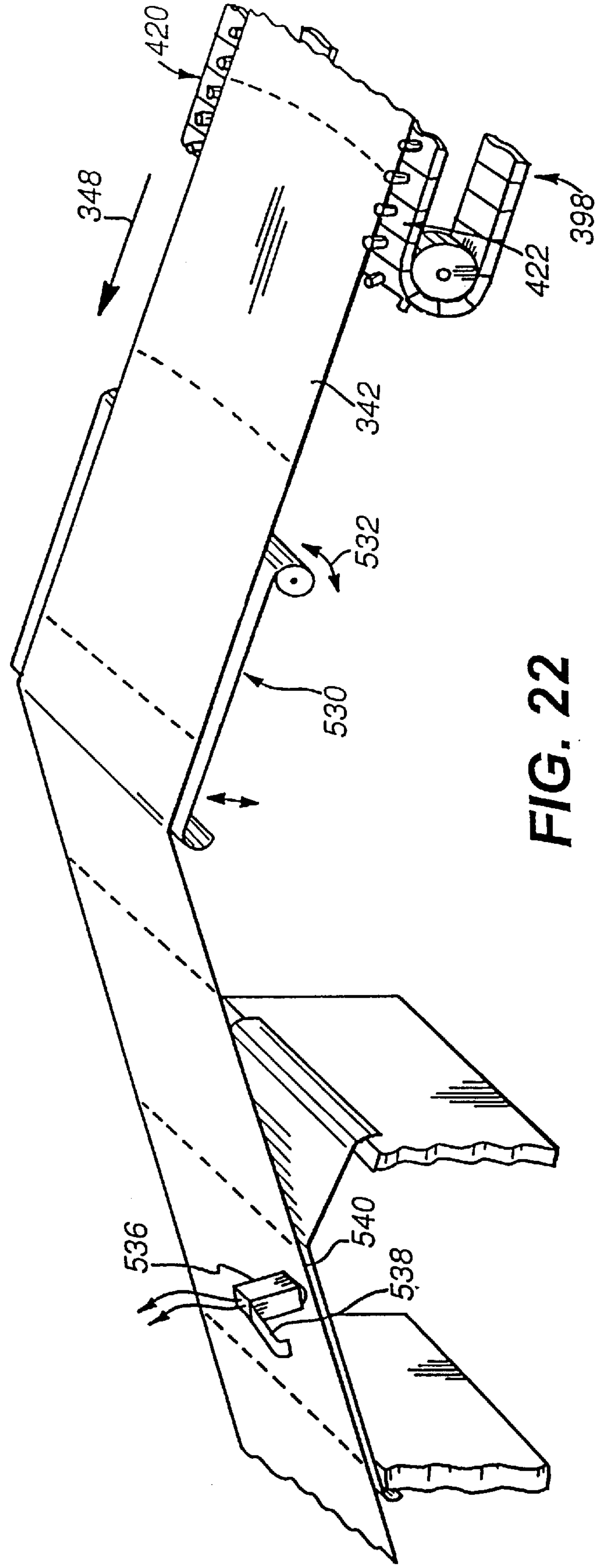
FIG. 22 is a partial schematic view of the web path including a skew sensor location according to the embodiment of FIG. 13.
Figure 23:
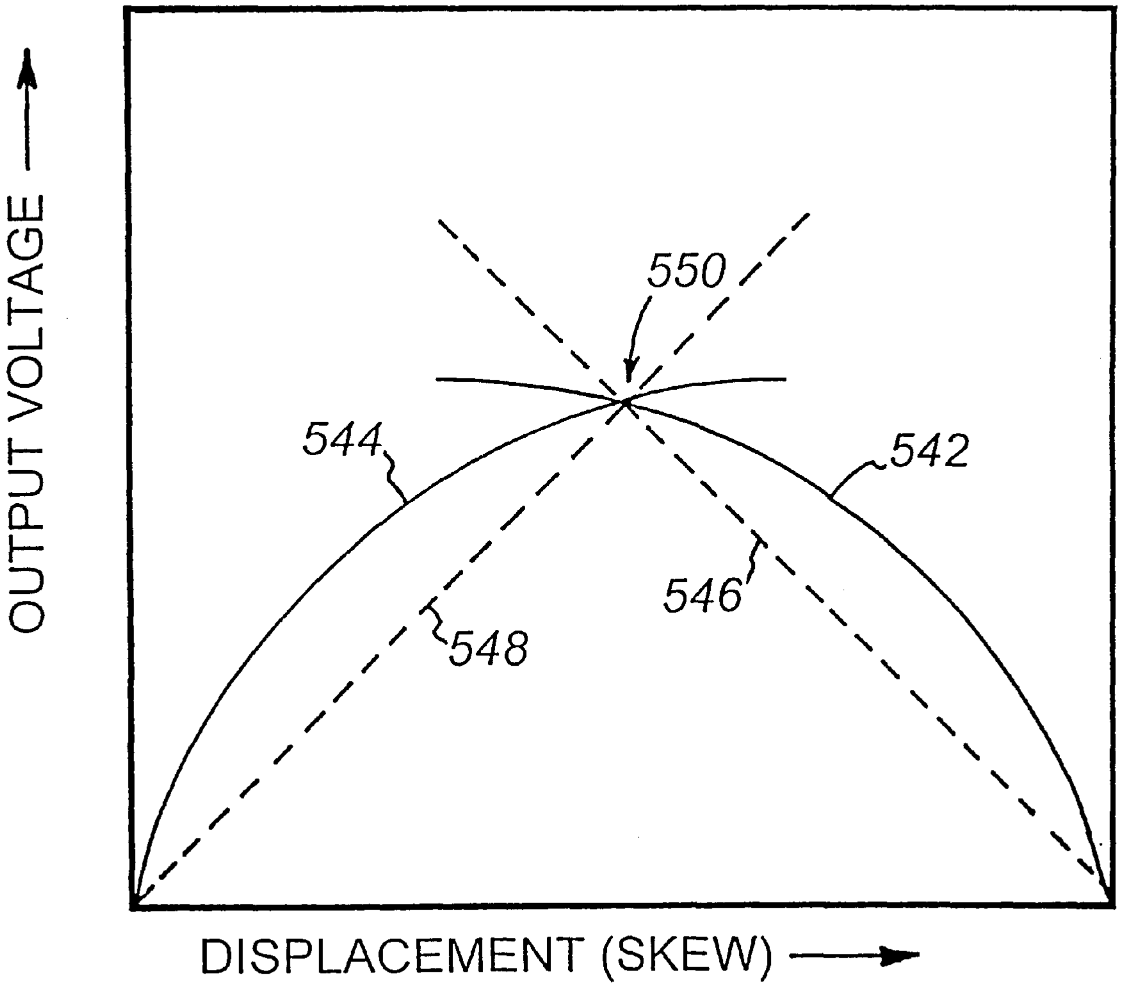
FIG. 23 is a graph of voltage versus skew for the skew sensor of FIG. 22.

In modifying the IBM series printer, it is recognized that pinless web may affect other aspects of the feeding process. As further detailed in FIG. 22, the web 342 exits the upper tractor feed unit 398 and passes over a dancer 530 that pivots (curved arrow 532) in response to tension exerted on the web between the fuser section 534 (FIG. 15) and the upper tractor feed unit 398. The dancer 530 instructs the fuser section 534 to speed and slow so that a relatively constant-sized loop of web 342 is maintained. Slightly upstream of the fuser section 534 is located a skew sensor 536. In the unmodified printer, a skew sensor uses an optical signal to read the amount of reflected light returned from the pin feed rolls as they pass under the sensor. However, since no pin feed holes are present, the skew sensor 536 according to this invention is moved inboard on a bracket 538 so that it is positioned adjacent an edge 540 of the web 342. The skew sensor 536 is interconnected with the printer control logic and operates in a manner similarly to the original sensor. It consists of at least two receptors that signal the presence or absence of a balance of transmission between signals. When the signals are balanced, it indicates that the edge 540 is located directly between the two sensors. With reference to FIG. 23, the performance of the sensors is illustrated by a pair of curves 542 and 544 that show output voltage of the sensor versus displacement or "skew". It has been recognized that the output voltage versus skew is modeled approximately on a section of a circle.

The original sensor included logic modeled on straight lines 546 and 548 shown in phantom. Accordingly, the skew sensor of this invention more accurately reads drift of an edge 540. Drift or skew of the edge 540 is compensated for by steering the rollers of the fusion section 534. In other words, these rollers are angled to cause a sideways drift of the web similar to that shown in FIG. 12. Steering is performed until both output signals cross at an approximate center point 550 wherein the edge 540 is balanced between the two sections of the sensor.

Figure 24:
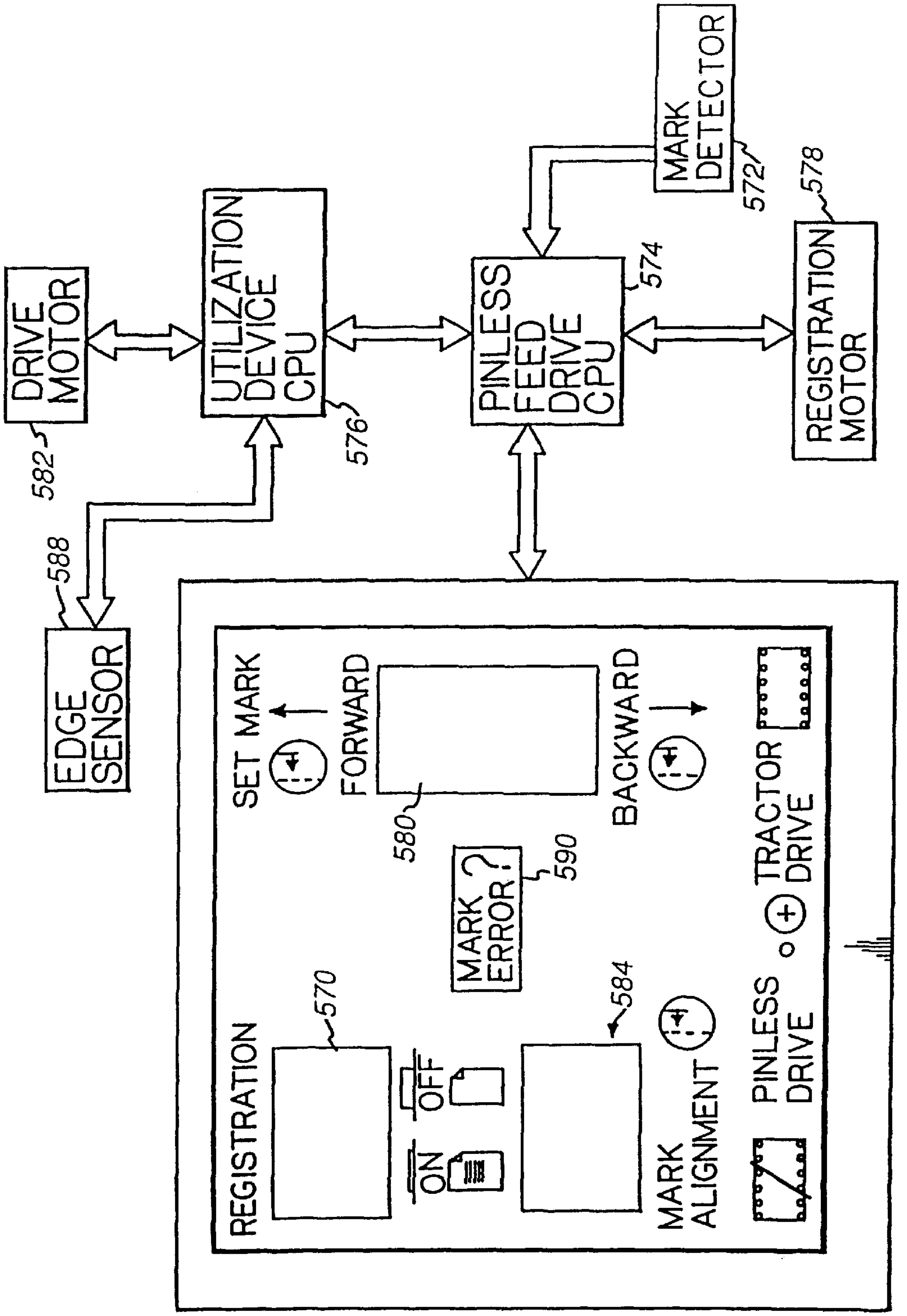
FIG. 24 is a control panel for use in the embodiment of FIG. 13.

With further reference to FIG. 24, a discussion of control of the pinless drive system according to this embodiment is now provided. In normal operation, the mark sensor according to this invention scans for marks when the registration control button 570 is activated. The mark detector 572 signals the pinless feed drive central processing unit 574 as each mark on the web passes under it. Simultaneously, the utilization device CPU 576 is tapped to read tractor pulse movement information. A transducer (not shown) located in the tractor pin feed system transmits a pulse each 0.008 inch of linear web movement. A comparison is made between passing of web through the tractor pin feed system, counting pulses and the known distance between marks. Any difference in the comparison causes the pinless feed drive CPU 574 to transmit an advance or retard signal to the registration motor 578.

The IBM series printer includes a function known as "autoload". In autoload, sheets are automatically driven through the tractor pin feed units and properly registered. To perform an autoload function, the sheet is threaded through the stiffener bars and into the lower tractor pin feed unit and drive wheel. The movement override switch 580 is instructed to move the web forward by directing a command through to the utilization device CPU and from the utilization device CPU to the drive motor 582. The pinless feed drive CPU taps the utilization device CPU for information about pulses as the sheet is moved forward. Movement occurs until mark alignment is indicated by the mark alignment indicator 584. At this time, a mark has been aligned directly under the mark detector 572. The number of pulses counted during that period is stored by the pinless feed drive CPU. To further determine the "top of form" so that printing is aligned with the front edge of the web, the web continues upwardly into the upper tractor pin feed unit to an upper edge sensor 588 (see also FIG. 15). This upper edge sensor also operates to detect jams during normal running operation. The edge sensor indicates when the "top of form" has been reached. The number of pulses to reach this top of form location are also recorded. Typically, another mark is read and then the system automatically retards the number of pulses required to place the top of form adjacent the image drum at initial point for printing. Following the alignment of top of form, the web begins advancing and printing begins as the web passes over the dancer and into the fuser section under its own guidance.

An added feature of the pinless feed drive CPU according to this invention is that it deactivates the vacuum on the vacuum belt assembly 400 of the upper tractor feed drive unit 398. This enables any slack in the web to be drawn up by the fuser section without the risk of crumbling between the upper tractor feed drive 398 and image drum 390.

It should be noted that a variety of registration protocols can be employed according to this invention. One particular protocol involves the establishment of a drive rate constant at initialization of a print run by determining the exact spacing between marks and comparing the spacing to the known distance generated by the pulses of the tractor feed unit. This constant can be used for subsequent calibration of the registration system as printing proceeds. The process of monitoring web travel and comparing actual travel to read travel can be implemented using a discrete comparator circuit or with a microprocessor that employs an appropriate software routine.

The pinless feed system according to this invention can include appropriate error warnings such as the mark reading error indicator 590, shown in FIG. 24. Further jam and feeding detectors can also be provided. These can signal alarms or shut down the print process and can record a number of erroneous sections of web by using appropriate counters interconnected with the mark sensor and/or utilization device CPU.

IV. Further Sensor Modifications For Skew and Advance

Figure 25:
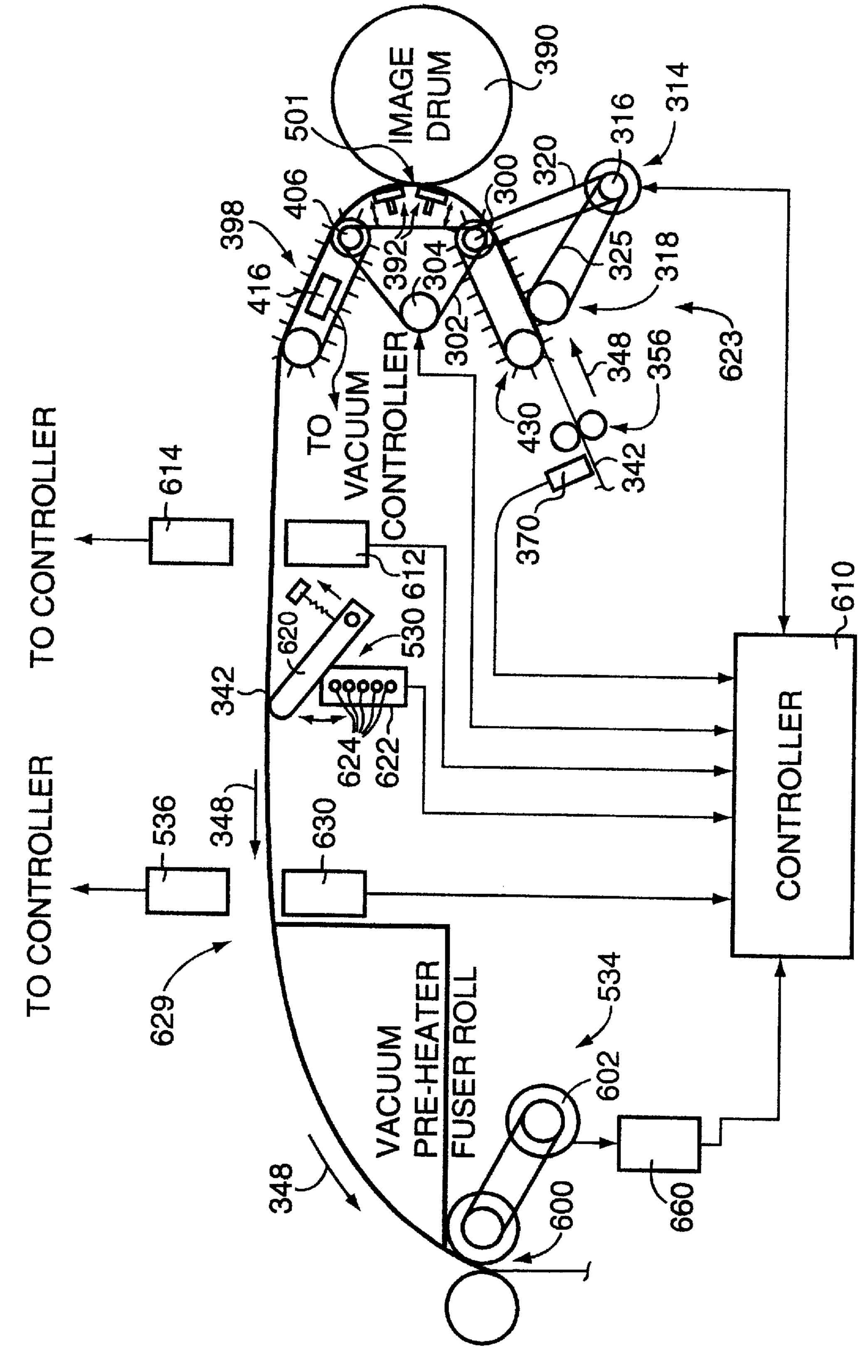
FIG. 25 is a schematic side view of a printer feed path illustrating the location and function of various web sensors according to a preferred embodiment.

A variety of sensors are employed in controlling the feed of web through the utilization device according to this invention. FIG. 25 illustrates a sensor arrangement according to a preferred embodiment. This sensor arrangement is particularly applicable to IBM® 3800 and 3900 Series high-volume laser printers and other models having similar components and feed path arrangements. Accordingly, like reference numbers are used or elements are substantially similarly or identical to those already described above. Components are shown schematically for the purposes of illustration in FIG. 25.

In general, the web 342 passes over the lower tractor pin feed unit 430 where it is driven by the drive roller 318. It passes into contact with the image drum 390. A pair of movable retractors 392 described above operate to move the web into and out of contact with the image drum. These retractors, as described above, prevent blurring of the web during start-up and shut-down by moving the web out of contact with the image drum 390. The web 342 thereafter passes over the upper tractor pin feed unit 398 that includes a vacuum box 416 and vacuum belt (not shown but described above). The web 342 then passes through a dancer assembly 530 and thereafter into the fuser section 534 which includes a fuser driver roll pair 600 driven by a separate fuser motor 602 as noted above, a central drive motor 304 drives the tractor pin feed units, the vacuum belt, and pinless feed drive roller 318. The pinless feed drive roller 318 is attached by drive belts 325 and 320 to the registration controller 314 that includes the harmonic drive differential and registration drive motor 328, described above.

In general, the image drum can be driven by the same central drive motor 304 or otherwise synchronized with the movement of the tractor pin feed units so that text is accurately laid upon the web as the tractor pin feed units moves. Since tractor pin feed units do not positively engage the web in a driving direction in a pinless mode, maintenance of registration is a significant concern. Primary registration, as described above, is maintained by a mark sensor 370 that communicates with the controller block 610. The controller block instructs the registration controller 314 to advance or retard the registration drive motor to, likewise, advance or retard the web so that it is maintained in synchronization with the movement of the image drum. In other words, the drive roller 318 is moved so that the web maintains a pattern of movement that it would have had if the pins were engaging consistently spaced pin feed strips.

As will be described further below, the controller 610 provides correction according to a particular format that requires a certain degree of drift before correction is imposed.

Downstream of the upper tractor pin feed unit 398 are positioned a pair of sensors that are used, in part, to confirm the proper functioning of the utilization device. A web sensor 612 scans for the presence of the web or absence of the web. It can comprise an optical sensor having an LED emitter and an optical pick-up. When a reflection off the web is detected by the pick-up, the system confirms the presence of web. The web sensor 612 transmits signals to the controller 610 that provide alarms if the web is not present. Alarms can be indicative of a jam, a web break or an exhaustion of web at the source. Appropriate commands to stop the utilization devices drive motors are given to the utilization device when web is absent.

Approximately, adjacent the web sensor is a "web-up" sensor 614. The web-up sensor is also an optical sensor having, for example, an emitter and detector. The web-up sensor 614 can be accurately positioned. It is interconnected with the controller 610 and scans for the occurrence of a lead edge of the web. The web-up sensor is employed specifically to control top of form feeding as described above. Location of the web-up sensor is selected so that a known distance for web travel can be ascertained. As described above, once the lead edge is located, the web is reversed so that the form is accurately positioned relative to the image drum. Pulses of the drive motor 304 are counted by the controller 610 to derive accurate locations. The controller, likewise, keeps track of the relative location of the sensed marks and, upon feeding of a top of form, these locations are initialized and tracked throughout the further feed process.

Downstream of the sensors 612 and 614 is positioned the dancer assembly 530. The dancer comprises a pivoting bar 620 and a series of 5 associated optical pick-ups in an array 622. In one arrangement, the array 622 can be located at the pivot point on an arc so that movement of the bar to different pivotal locations activates and/or deactivates individual sensors. The sensors can include a series of LEDs 624 each individually addressed by the controller 610. The LEDs have associated optical pick-ups such that movement of the dancer bar 620 adjacent a particular LED sends an associated signal to the controller associated with that LED. Any acceptable pick-up arrangement is contemplated and/or a continuously variable sensor arrangement can also be contemplated. It is significant primarily that movement of the pivoting dancer bar 620 to different positions causes associated position signals to be generated by the dancer assembly 530. These position signals are received by the controller 610. The position signals are used to control movement of the fuser section 534. When web moves through the fuser section 534 more rapidly than it moves through the image drum 390, the dancer bar 620 will move downwardly under web tension. Alternatively, when the fuser section 534 draws web slower than it moves past the image drum 390 then the dancer will rise under force of an internal spring 621 (shown schematically in FIG. 25) to take up slack in the web adjacent the dancer 530. Movement of the dancer, thus, is used to control relative movement of the fuser section 534 relative to the image drum drive section 623. This is also described further below.

From the dancer assembly 530, the web moves through a skew sensor section 629. The skew sensor 630 is "native" to the utilization device (e.g. it is provided by the original equipment manufacturer, IBM) and provides both fine adjustment of the drive rate of the fuser section 534 and also transverse (to the direction of web travel as shown by arrow 348) adjustment of the web through the fuser roll pair 600. Both operations are performed in the native arrangement by scanning the location of holes in one of the pin feed strips in a manner described further below. This sensor 630 is not specifically applicable to a pinless feed embodiment. Note, however, that since the fuser section does not include a tractor pin feed drive, "steering" in a transverse direction is desirable. Steering is accomplished by changing the pressure along the nip between the two rolls of the roll pair 600 similarly to that shown in FIG. 12.

An associated pinless skew sensor 536 is also provided. The pinless skew sensor is particularly utilized to sense the location of the edge of the web 342 as it passes by the pinless skew sensor 536. As will be described further below, fine tuning of the draw rate of the fuser section 534 is provided by monitoring the fuser drive motor 602.

Figure 26:
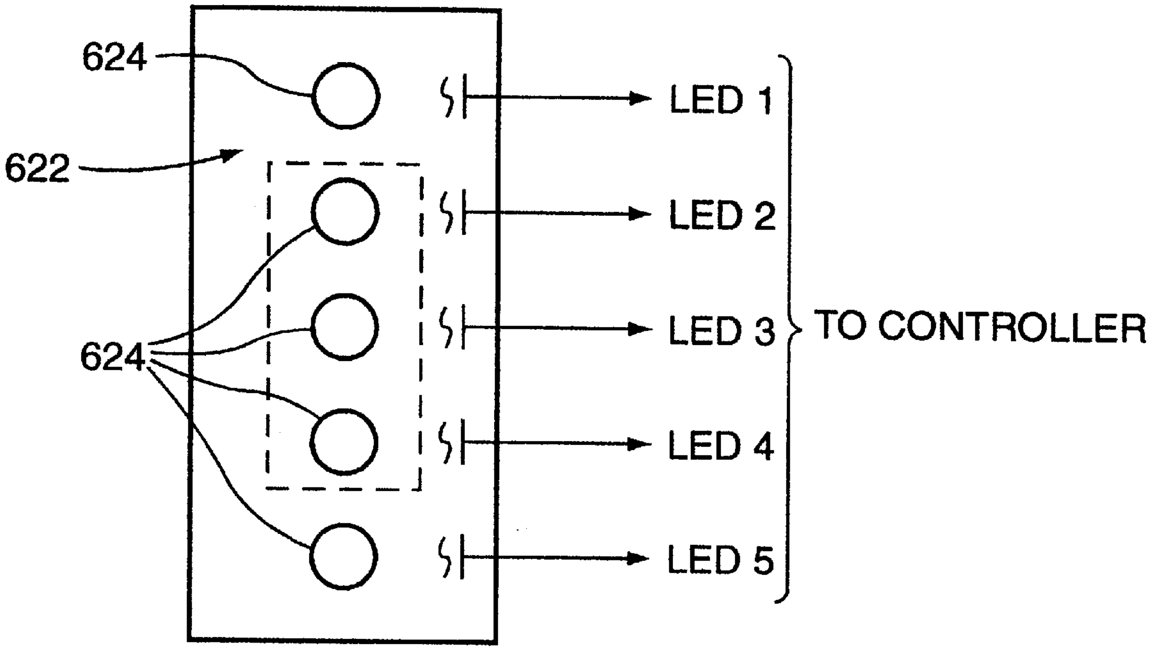
FIG. 26 is a schematic diagram of an optical pick-up arrangement for the dancer roll assembly of FIG. 25.

With further reference to FIG. 26. the LED sensor array of the dancer assembly 530 is shown schematically. For the purposes of this discussion, it is assumed that the dancer moves between LED1 through LED5 depending, respectively, upon whether the web is slack or taut. LED1 transmits a signal to the controller when the web is overly slack, indicating that the fuser section 534 is drawing a web at too-slow a speed relative to the drive roller 318. Conversely, LED5 transmits a signal, based upon movement of the dancer bar 620 to this location when the web is overly taut based upon a too-rapid driving speed at the fuser section 534. LED3 is a mid-point signal indicating a proper amount of deflection of the dancer bar 620, which is used to trigger the LED array signal. At this speed, the web is in a steady state, being driven by the drive roll 318 at approximately the same speed that it is taken up by the fuser section 534. LED2 represents an initial slackness in the web while LED4 indicates an initial tautness in the web. Movement between LED2, LED3 and LED4 by the dancer bar 620 is considered acceptable, and only fine regulation of control (to be described) is required. Movement of the dancer bar to LED1 or LED5 invokes coarse or gross calibration (also to be described).

Figure 27:
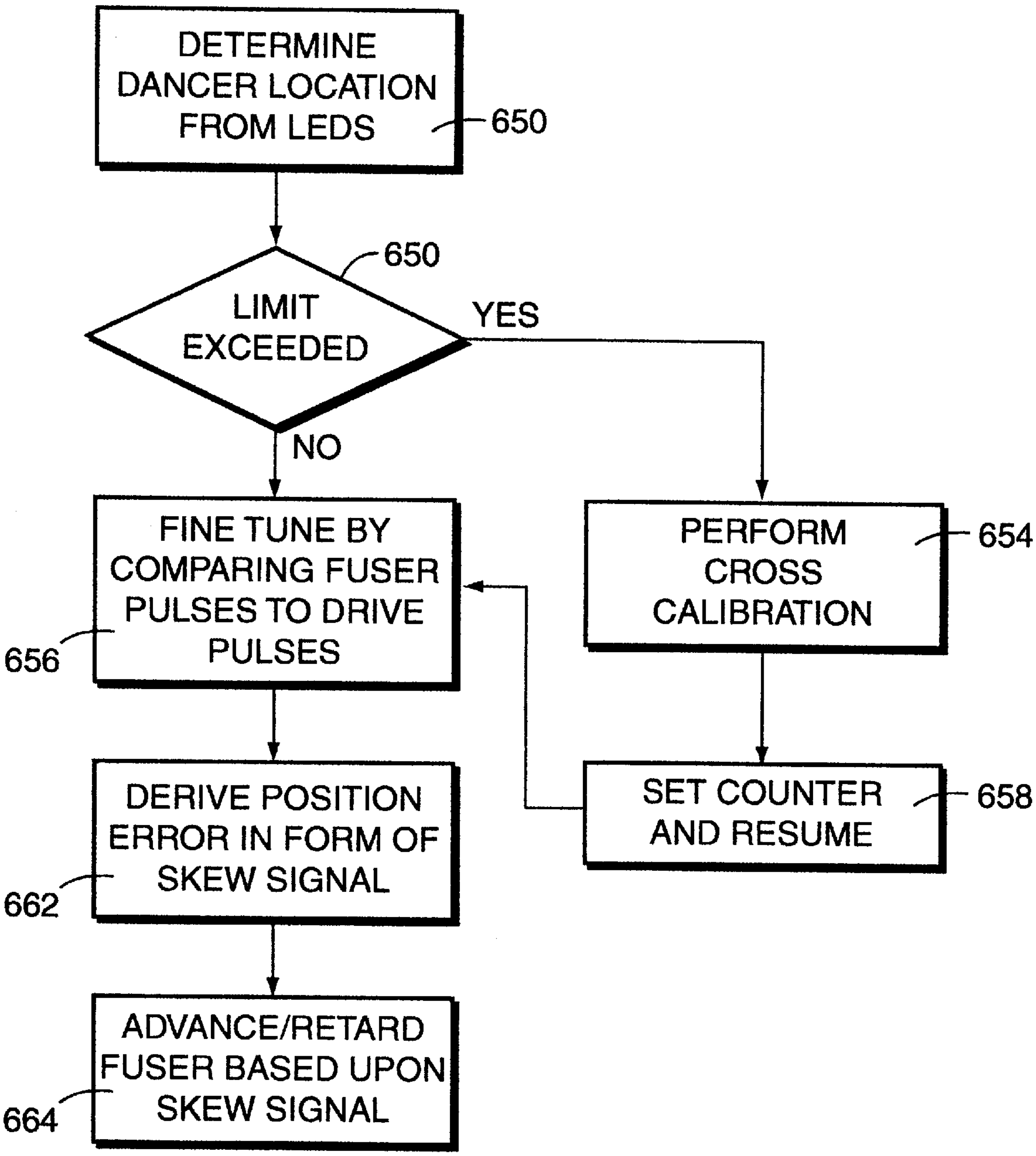
FIG. 27 is a flow diagram of a positioning sensing procedure controlled by the dancer roll of FIG. 25.

With further reference to FIG. 27, regulation of the fuser drive motor 602 to provide an appropriate draw rate for web occurs according to the illustrated procedure. This procedure is executed by the controller 610. First, the dancer location relative to the sensing LEDs is determined in step 650. If a limit is exceeded, then decision block 652 branches to step 654 and a gross calibration is performed. In particular, if LED1 or LED is detected, then the fuser section is driven at an overspeed (or underspeed), as appropriate) until the dancer bar 620 is re-centered at LED3. In some embodiments, movement to LED2 or LED4 can also trigger a gross calibration. A gross calibration, in general, overrides the current tracking of the fuser drive motor. The tracking occurs through an onboard encoder 660 (see FIG. 25) that is operatively connected by gears, shafts or belts to the fuser drive motor 602. The encoder transmits pulses to the controller as the motor rotates. The pulses are translated into a given linear movement of web therethrough. The controller 610 receives pulses as a predetermined distance of web passes through the fuser rollers 600. The number of pulses can be proportional to the number of pulses generated by the onboard encoder of the drive motor 304 or another encoder located in operative connection with the driver roller 318. The controller counts both pulses received by the drive motor 304 and the fuser drive encoder 660. The pulses are compared continuously in block 656. Counters are used for performing this comparison. Returning to the gross calibration step 654, the counter for the encoder 660 in the controller 610 is reset in step 658 after the gross calibration is performed and the dancer is re-centered adjacent LED3. Counting is then resumed in step 656. By counting pulses associated with the drive roller 318 and the fuser roll 600, the controller derives a position error in step 662. This position error is derived in the form of a skew signal similar to that generated by the skew sensor 630. In particular, the skew sensor 630, and the associated control procedures native to the utilization device sense the presence or absence of holes at one-half inch intervals. Holes must appear within the sensor 630 each time the encoder 660 (from the native utilization device) records passage of a one-half inch increment of web. If holes do not appear, or their intensity indicates a drift, then a position error signal is derived. The position error signal for the native skew sensor 630 simultaneously generates a skew signal by determining the side-to-side orientation of each hole as it passes. This is described further below. The sensing arrangement of this embodiment generates an identical signal (containing both advance/retard information and skew information). The derivation of this signal is described further below. The advance/retard component of the signal is used to advance or retard the fuser drive in step 664 by operation of the controller 610.

Figure 28:
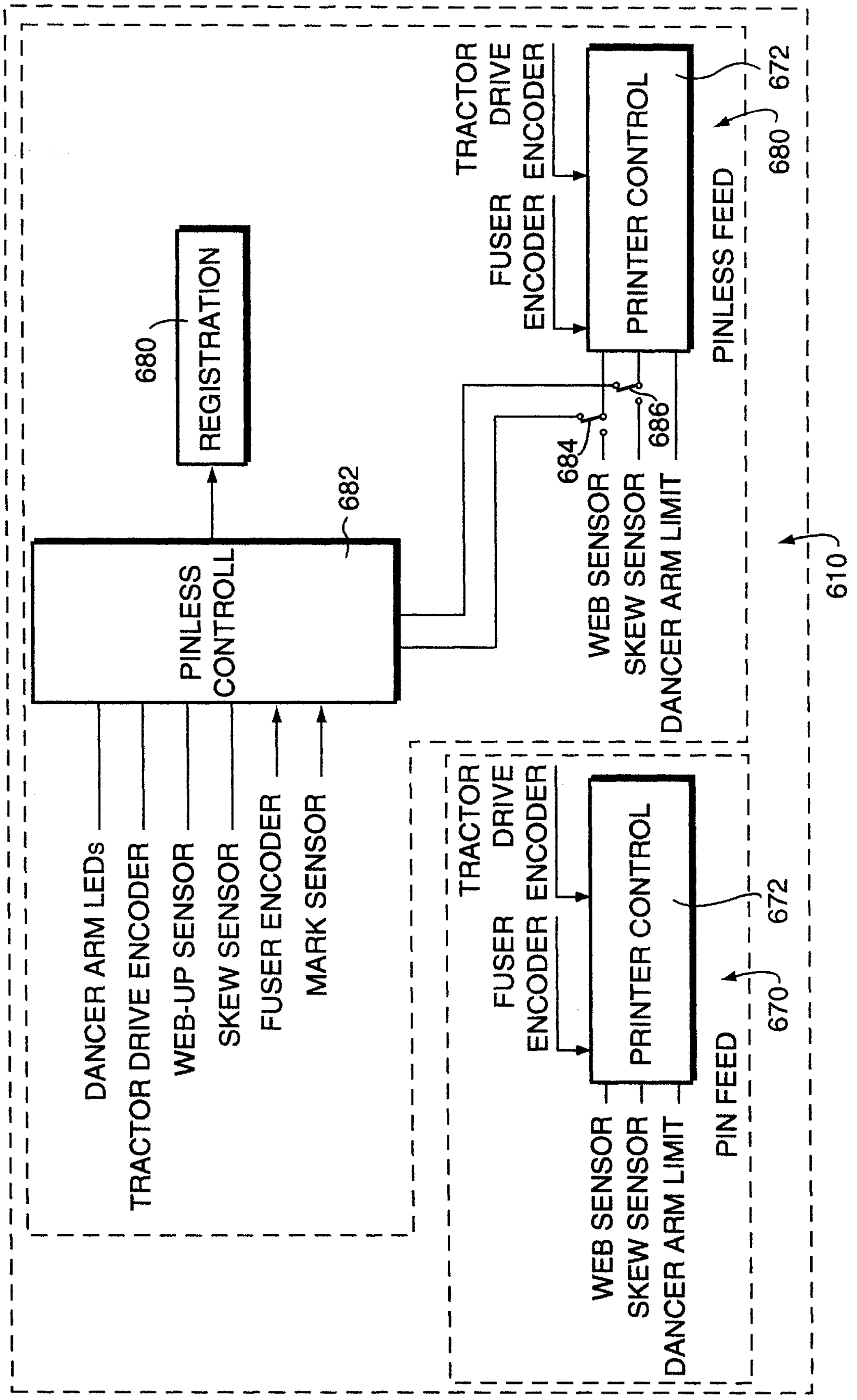
FIG. 28 is a block diagram illustrating the general sensor control arrangement according to the embodiment of FIG. 25.

FIG. 28 illustrates, generally, the organization of the controller 610. The feeder encoder and drive encoder also input signals. The fuser encoder signal is used in conjunction with the overall skew sensor signal to determine advance/retard of the fuser drive. In the pinless feed mode 680 the web sensor and skew sensor functions are routed through the pinless control block 682. Solid-state switching 684 and 686 can be provided via the control panel (described above) to accomplish the functions of the web sensor and the skew sensor via the pinless control block 682. The pinless control block receives signals from the dancer arm LEDs, the tractor drive encoder, the web-up sensor, the modified skew sensor (to be described below) the fuser encoder and the mark sensor. The printer control independently receives fuser encoder and tractor drive encoder signals for various unchanged utilization device functions. These encoder signals are provided to the pinless control, along with the mark sensor signal to generate registration signals used specifically by the differential motor for the drive roller 318 as shown in block 690. Note that registration of the fuser section relative to the drive section occurs through the native printer control block 672. This involves specific emulation of the native skew and advance/retard signals for input to the printer control block 672 since the native printer control block is programmed to "recognize" a skew signal leaving a particular characteristic. The signal generated by the pinless drive embodiment of this invention is designed to work with the print control block in its native state so that substantial alterations to the print control block can be avoided.

Figure 29:
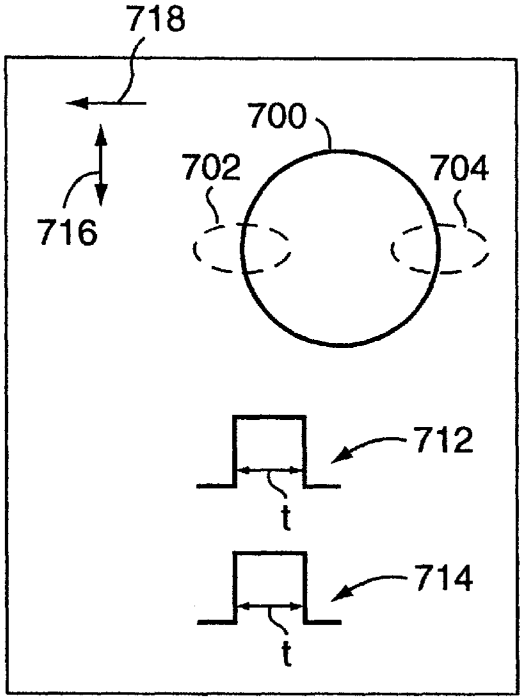
FIGS. 29–31 are schematic diagrams of position and skew signals recognized by the controller of the printer arrangement of FIG. 25.
Figure 30:
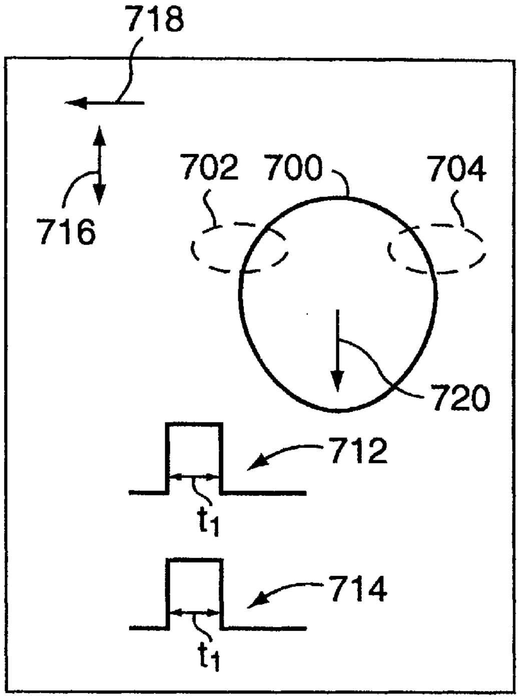
Figure 31:
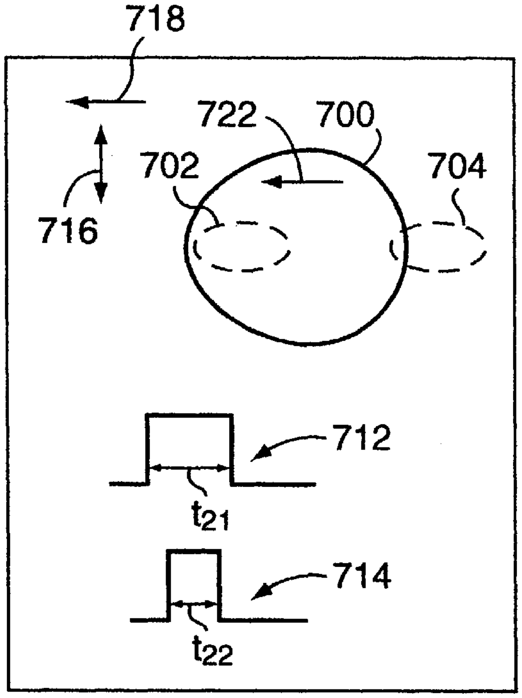

The generation of the native skew and advance/retard signal is further described in FIGS. 29, 30 and 31. In each of FIGS. 29–31, reference is also made to the predefined sensing state for the native skew sensor 630, the signal of which is being emulated. FIGS. 29, 30 and 31 should clearly illustrate how both advance/retard and skew are emulated within a single sensor. The sensor 630 is an optical sensor which measures the intensity of light at two discrete points that are scaled to the size of an average pin hole. As detailed in FIG. 29, the pin hole perimeter 700 falls within the middle of each of two individual sensor sections 702 and 704 that are located, generally, upstream and downstream of the hole as it moves therethrough. The sensor is organized as a quadrature unit of known design that can sense intensity variations based upon how much light passes through the hole to each of the sections 702 and 704. Each section 702 and 704 generates its own discrete time-dependent pulse 712 and 714, respectively. The pulse is dependent upon the amount of time that the section is exposed to light. Maximum exposure to light for each section 702 and 704 occurs when each section is centered in a transverse direction (double arrow 716) relative to the feed direction (arrow 718). At this time, each section 702 and 704 generates a pulse 712 and 714, respectively, having a time duration of t as shown in FIG. 30, if the hole moves laterally in the transverse direction (see arrow 720) then a smaller portion of the hole will pass through each of the sections 702 and 704 at a given time. The respective sensor signals 712 and 714 will have a shorter time duration t1 since both sections are activated for less time. It should be noted that these time durations are based upon a sample interval in which the sensor is active. In other words, the sensor is strobed at a time in which passage of a pin hole is expected. The active interval is set by the printer control block based upon the movement of the encoder 660 of the fuser motor 602. Pulses equal to the interval between centers of pin holes (one-half inch in this embodiment) are counted and the sensor is activated during the period in which the hole is expected to pass by the sensor. The associated sensor signal 712 and 714 are sampled. The time of each of these signals during that sampled period is used to determine skew. A skew is found in FIG. 30 since the time tl is less than the desired time t (shown in FIG. 29). In FIG. 31 the hole 700 has advanced beyond its expected position at the time the sensor is activated as shown by arrow 722.

It is assumed in this example that skew (as denoted by transverse arrow 716) is not present. Sensor 702 will be active for a longer period than 704 during the sample period. Thus the associated sensor signal 712 will have a longer length t21 than the sensor signal 714 which has a length of only t22. This, thus, indicates that drift has occurred in the driving direction (arrow 718). As a general rule, if the signal 712 and 714 exhibit a time that is equal, but shorter than the expected time t, then skew has occurred. If, however, the times of sensing signals 712 and 714 are unequal to each other then a drift in the driving direction is indicated It is possible for both conditions to be present simultaneously (e.g., both skew in the transverse direction and drift in the driving direction) the signals will be both uneven and shorter than expected in such an occurrence. The time t, in which a standard centered, registered passes through the sensor can be determined readily based upon the speed the web is traveling, the size of the sensor sections 702 and 704, the size of the hole and the sample time. It can be varied depending upon the specific utilization device in which a signal must be emulated. As used herein, the signals generated by the quadrature sensor in the native utilization device shall be termed “time-based, pulsed” skew and advance/retard signals. In other words the signals occur at regular strobe intervals (e.g. they are “pulsed”) and are time-based in that the variation of the signal time shall be used to indicate the relative position of the web.

Figure 32:
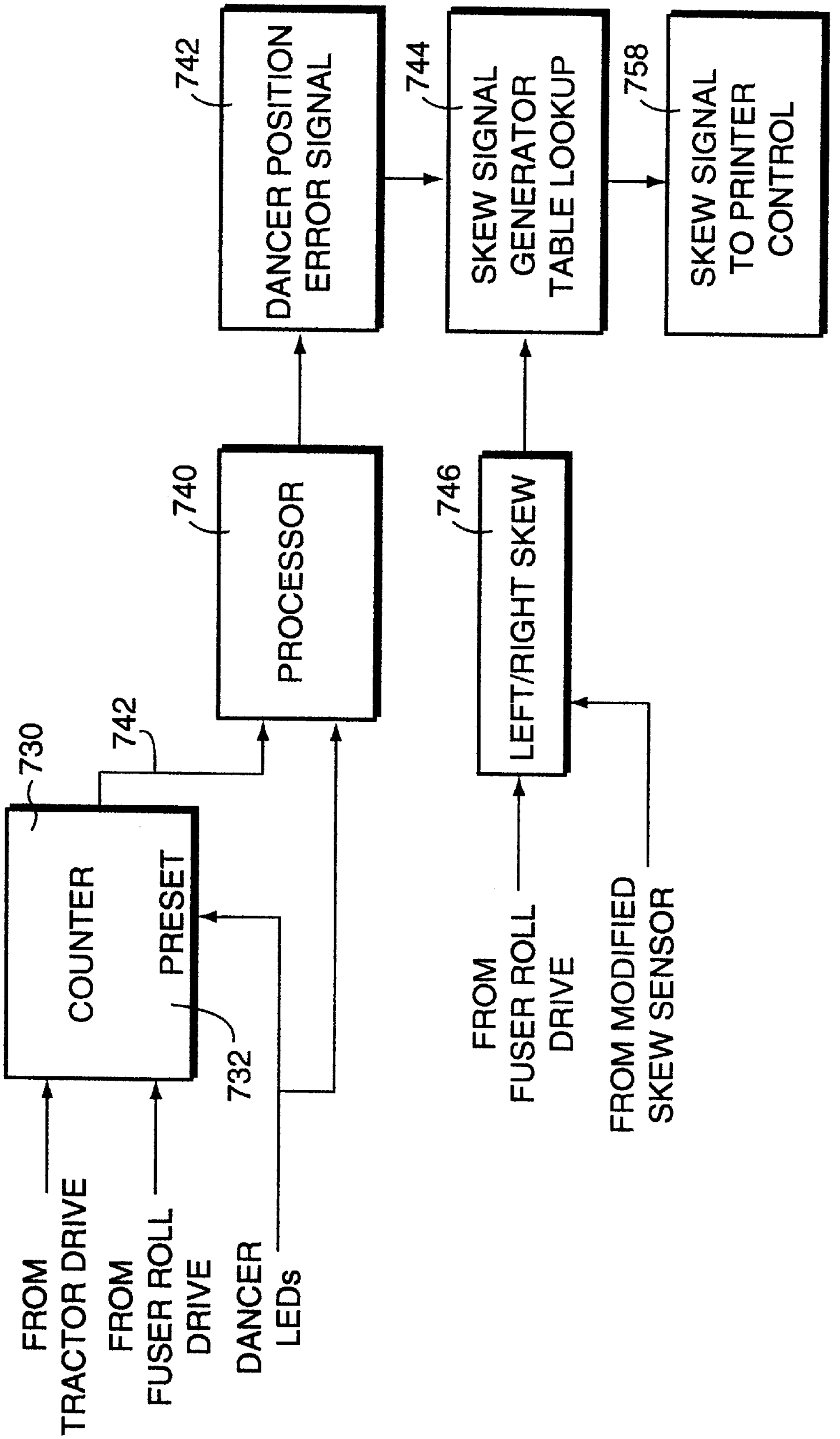
FIG. 32 is a block diagram of a counter and processor for deriving a dancer position error signal according to the embodiment of FIG. 25.

According to this embodiment, the fuser encoder 660 inputs pulses directly to the pinless control block to derive a dancer position error signal. FIG. 32 illustrates, generally, the process in which the dancer position error signal is derived. The tractor drive inputs pulses to a counter block 730. The counter block also receives pulses from the fuser drive 732 the pulses generated by the tractor drive and fuser drive can vary in total number. For example, 20 pulses may be generated by the tractor drive for every one-half inch of movement, while only 10 pulses may be generated by the fuser roll drive. A scale factor is provided within the counter to account for any differences in frequency and/or scale (e.g., amount of length associated with a given pulse duration) of each input. An input from the dancer LEDs is used to preset the counter 730. In other words, when the dancer LEDs pass out of the center location (LED2–LED4) then the counter must be reset following gross calibration. Reset occurs when LED3 is triggered by the dancer arm. The output of the counter is delivered to a processor 740 over a line 742. The line 742 can carry total numbers of pulses countered for the tractor drive and the fuser roll drive independently, or in combination, for a given time period. The processor receives a signal from a dancer LEDs so that it can determine whether a gross calibration or fine tuning is in progress. When fine tuning is in progress, then the processor compares the number of pulses for the tractor drive and the fuser roll drive. If the total number of pulses for the fuser roll drive exceed a respective number of pulses for the tractor drive then the fuser drive is moving to rapidly, and a retard signal is generated. The magnitude of the retard signal is proportional to the difference between the number of pulses desired for the fuser drive for a given tractor speed versus the number actually sensed. Conversely, if the number of pulses for the fuser drive are less than that desired for a given number of pulses for the tractor drive, then the fuser drive is moving too slowly and an advance signal is derived by the processor 740.

Again, the magnitude of the advance signal is dependent upon the difference between the desired number of pulses for the fuser roll drive given a measured number of tractor drive pulses versus the actually sensed number of fuser drive pulses. The dancer position error signal generated in step 742 is input to the skew signal generator in step 744. The skew signal generator can comprise a microprocessor or state machine. The generator simultaneously receives a left/right skew signal from block 746.

Figure 33:
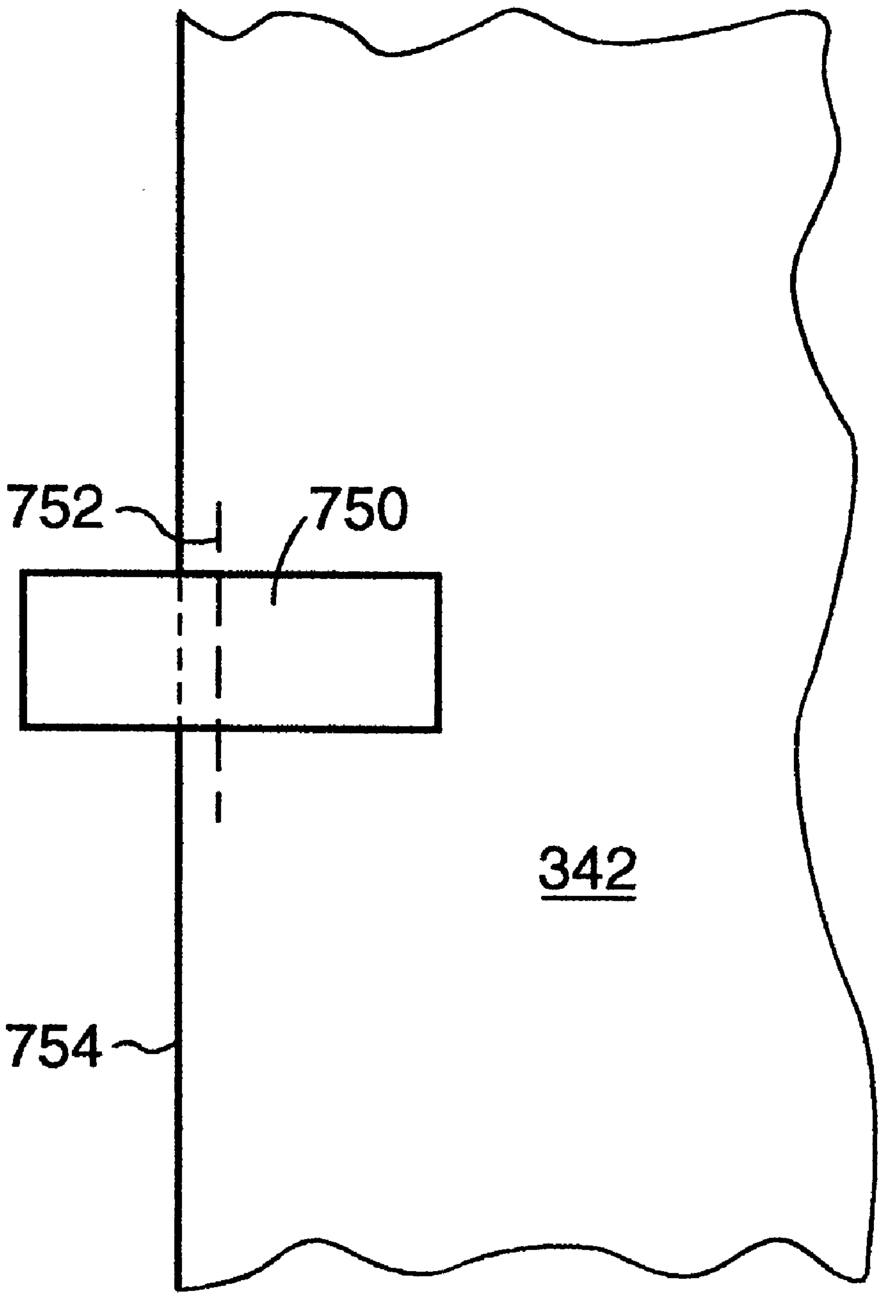
FIG. 33 is a schematic plan view of a modified skew sensor according to this invention scanning an edge of a pinless web.

The left/right skew signal in block 746 is generated by a modified skew sensor that is shown in more detail in FIG. 33. Briefly, the skew sensor comprises a linear optical sensor bar 750 located so that it is centered (see center line 752) at the desired location of the side edge 754 of the web 342. The amount of web passing under the sensor bar 750 varies the intensity of light sensed by the sensor bar 750. An associated illumination source can be provided opposite the sensor bar 750 for this purpose. The intensity sensed by the sensor bar 750 is scaled from a minimum to a maximum value. An intensity associated with the location of the edge 754 of the web 342 adjacent the center line 752 is derived. Deviation of the edge away from this center line is also derived. In one embodiment, the deviation can be approximately linear between minimum and maximum intensity values. The intensity signal from the modified skew sensor is transferred to the block 746. It is sampled (strobed), based upon the fuser roll drive pulses at the appropriate times (e.g., at one-half inch intervals like the sampling of holes) and the digital left/right skew signal is generated by the block 746 based upon the measured intensity. Given a numerical value for left/right skew and a numerical value for dancer position error the skew signal generator step 744 uses a look-up table based upon known time increments observed for the skew sensor signals 712 and 714 (FIGS. 29–31) to generate an emulated skew signal in step 758. The skew signal is provided as two discrete signals 712 and 714. These signals occur at proper time increments based upon the sample rate establish by the fuser roll drive.

A look-up table for use in the controller 610 of this embodiment can be initially derived by incrementally skewing the web and incrementally advancing and retarding the web independently of each other, and then both skewing and advancing/retarding the web simultaneously to generate a series of time values for the skew signals 712 and 714 under a variety of conditions. This is accomplished using the conventional sensor 630 with a web having pin feed holes. The amount of skew and drift (advance/retard) is measured during this process. The skew and advance/retard are then repeated for a pinless web and the associated dancer position error signal and left/right skew derived, respectively, in block 742 and 746 are recorded. These values are then associated directly with the previously derived time values to produce a look-up table. Alternatively, time curves can be derived based upon experimental observation and skew signals can be generated by attempting to fit the measured position error signal (step 742) and right/left skew signals (step 746) to the time curves. A variety of acceptable techniques can be used to produce the final skew signal 712 and 714 recognized by the native printer control.

Referring again to FIG. 27, the advance and retard of the fuser in step 664 occurs based upon the printer control block in conjunction with the steering of the fuser since the skew signal as recognized by the printer control is a combined driving and steering signal. The process for emulating the signal enables the fuser to perform both advance/retard and steering functions in a manner previously established without substantial alteration of the printer control or fuser drive mechanism.

V. Further Registration Improvements

Figure 34:
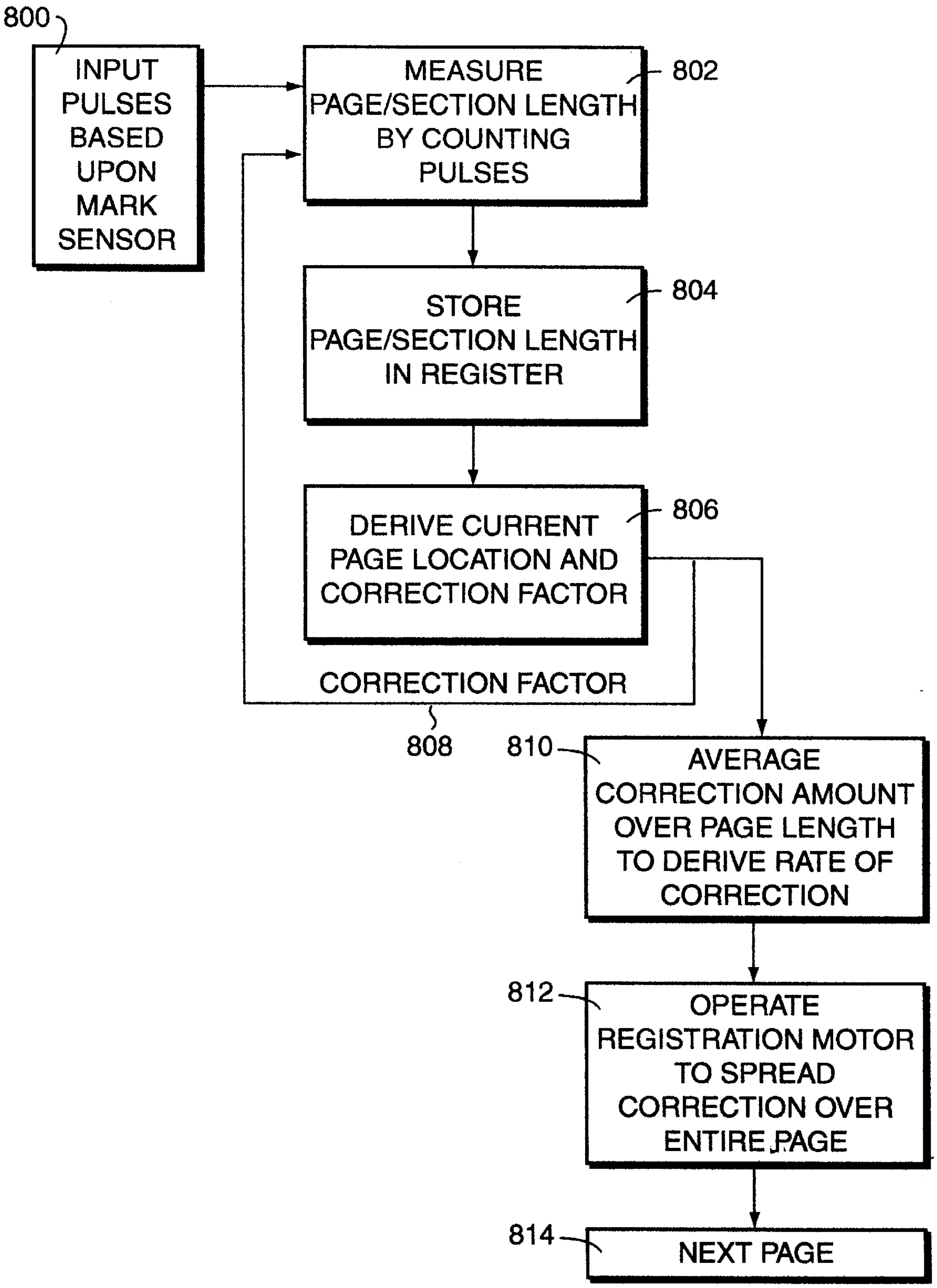
FIG. 34 is a block diagram of a procedure for registration motor movement according to a preferred embodiment of this invention.

It has been determined that correction of registration is improved when registration advance/retard in the drive roller 318 occurs at a selected rate and in an overall magnitude that is carefully controlled. In particular, correction of registration abruptly during the printing of a page or section of web by a moving image drum can result in blurring of the web. For example, if toner is to be applied to the web by the drum as it moves past the image drum, a sudden advance or retard as a line of printed text is laid down would cause a printed text to either become abruptly stretched or compressed. This discontinuity occurs because the image drum is moving a constant speed and the web is suddenly sped up or slowed down relative to the drum's movement It is, therefore, desirable that correction be made in a manner that reduces the potential for blurring based upon a sudden "jump-discontinuity" in the processing of the web. FIG. 34 illustrates a procedure for applying registration correction to the drive roller that would not substantially interfere with the effective operation of the utilization device element.

As described above, the location of the mark sensor 370 according to this invention is known accurately relative to the point of contact 501 of the image drum 390 with the web. The distance of the mark sensor 370 from the image drum is typically more than one page length. Accordingly, corrections to the registration of each page can occur before the downstream edge (e.g. the lead edge) of the page reaches the contact point of the image drum. The timing of when the corrections should begin is based upon when the upstream end of the page or section reaches the contact point 501 of the image drum. The image drum's movement is known based upon pulses generated by the central drive motor 304 which forms a standard movement signal for the image drum and the tractor pin feed units. The marks on the web are located at intervals that correspond to relatively exact page or section lengths (Note: web is often subject to shrinkage or stretching, so marks may not be exactly spaced relative to each other in absolute distance terms. This is another reason for the advance/retard function on the drive. Nevertheless the marks each indicate the start of a new section or page and are relied upon by the utilization device of this invention for initiating a new page/section.). A mark can be placed after each page or after a series of pages. Nevertheless, the spacings between the marks represents a known distance. By calculating pulses generated by the central drive motor 304 between sensed marks, the length of each page can be determined. Alternatively, an accurate page length can be consistently determined regardless of any slippage of web at the drive roller by calculating the time that a mark passes through the mark sensor, and comparing this time to the relative location of the image transfer drum along its path of rotation. The length of the page is then determined, based upon the known distance along the web path (about 13 inches) from the mark sensor to the image drum contact point 501. This distance represents a fixed number of increments or pulses that can be used to determine the length of the page. In other words, the system "knows" where in a current page it is printing (i.e. where the contact point is relative to the current page as a number of pulses). It also "knows" the exact distance from the contact point to the mark sensor. The system also knows the length of the page it is currently printing based upon the preceding mark and pulse count. When the mark is sensed, it then can calculate, in pulses, the length of the next page in the queue along the web.

In FIG. 34, a procedure for controlling registration correction is illustrated. Step 800 details the inputting of pulses from the central drive motor are transmitted to the registration controller. The pulses are keyed to the passage of marks through the mark sensor. Based upon the number of pulses, which each translate into a predetermined length increment, the overall length of a page or section is determined in step 802. The length of the page or section is based upon the spacing between marks, since the spacing between marks indicates the relatively exact spacing between pages along the web, or based upon the total distance from the sensor to the contact point as described above. Whichever technique for determining page length is employed, by counting the number of pulses, the total length of the page or section is determined. If marks occur between multiple pages or sections, then the count is divided appropriately by the controller to determine the individual page length.

Once a page length is determined, the page length is stored in a register 804. This register is shifted each time a page or section passes through the image transfer drum so that a current page length is read and length values for sections that have fully passed through the image transfer drum are passed out of the register. This shifting process is described in the basic registration embodiment above. Using techniques also described for the basic registration embodiment above, the location of the mark relative to the current position of the image drum (as it rotates to lay down the image) is determined and a position error is derived in step 806 if any error is detected. A correction factor equal to an amount of offset is determined in step 806. The correction factor is fed back via branch 808 to the measurement step so that the page length is modified to account for the fact that an error has occurred. Otherwise, the correction of registration by the registration drive motor would become unsynchronized with the number of pulses generated by the central drive motor and the error would continue to be multiplied as the correction is input to the registration drive motor. In other words, any correction carried out by the registration drive motor will "throw off" the pulse count for the next page by the amount of the correction factor. This is accounted for by feeding the correction factor back to the ongoing page length counting routine, sine the page is being advanced by a certain number of "pulses" that will not be transmitted via the central drive motor. Note that the pulses are relative to the tractor pin feed units and central drive motor's movement. Actual movement of the web is traced by marks and error correction factors are derived by determining the difference between number of pulses generated versus occurrence of marks. The correction factor is the amount that the independent registration drive motor will move the web notwithstanding the generation of pulses by the central drive motor.

Given the page length as stored in the register in step 804, the correction factor generated for a given page is then averaged over the entire page length in step 810 to derive a correction rate at which the registration motor will operate as the page or section passes through the contact point of the image transfer drum.

Since the pages upstream of the image drum as its mark is read, the system can derive all necessary error correction information before the page's downstream edge reaches the contact point 501 of the image drum. Thus, correction can be carried out through over the entire length of the page.

In step 812 the registration motor is operated. The operation occurs in increments or "steps" that are spread out over the entire movement of the page through the image drum. The movement of the registration motor can be accomplished by timing the input of movement steps based upon the known time for a page of the drive length to pass through the image drum. Alternatively, input of steps can occur after a given number of pulses (as a fraction of the total number of pulses for the page) have occurred. A variety of known control techniques can be used to spread the movement of the registration motor over the known page length. It is desired primarily that the correction movement of the registration motor begin approximately at the time when the page is expected to reach the contact point image drum, and that that the movement of the registration motor to effect correction proceed thereafter in a relatively even manner throughout the length of the page as it passes through the contact point of the image drum. In this manner, the correction is relatively undetectable for that page. Where utilization device is a printer, the correction will be apparent primarily in a slight lengthening and/or compressing of the image text on a line-by-line basis. However, this lengthening and compressing, when spread over an entire page length, is seldom noticeable.

As detailed in step 814, the next page, as identified by the utilization device by the next mark, passes through the drive section of the utilization device. As it passes through, it is again measured, and an appropriate correction factor is derived. Note that the measurement of the page (e.g., when the mark is to be expected to pass through the mark sensor) is modified based upon the previous correction factor. Typically, the next page is being measured as the previous page is undergoing correction. It is contemplated that the correction factor can be entered into the measurement step 802 in increments since the next page or section maybe measured as the previous page is in the midst of a correction operation. Thus all correction might not be entered into the preceding page when the succeeding page is located at the mark sensor.

Note that the procedure for spreading a correction of registration over an entire section or sections need not be carried out over substantially the entire length of the page, rather, the pulses of the drive motor can be counted to locate particular regions in which a registration correction is less noticeable, such as a graphics area or large text. The correction can be spread over this smaller area by dividing the total section length to obtain the appropriate subsection or area length. The correction is then carried out by the registration motor when the controller identifies (based upon pulse count) the passage of this area through the image transfer drum.

Figure 35:
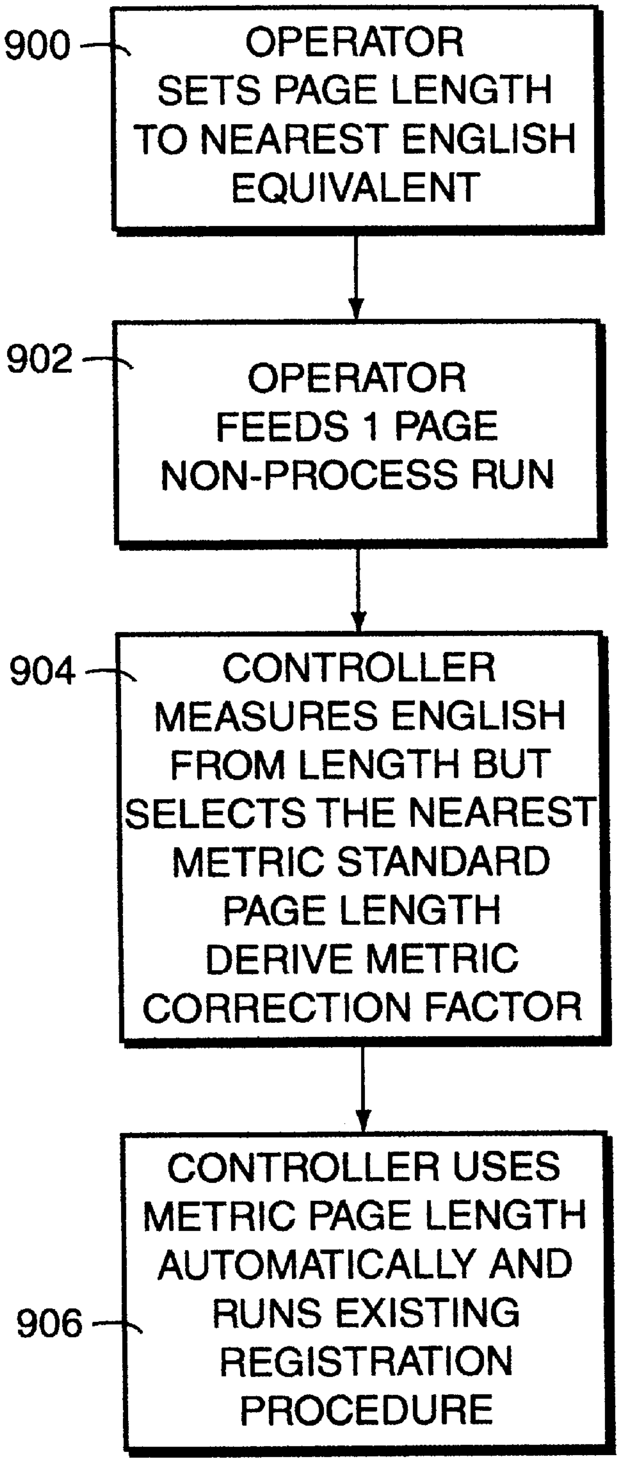
FIG. 35 is a block diagram of a procedure for enabling the utilization device to convert from English system page lengths to Metric system page lengths according to an embodiment of this invention.

The foregoing technique for providing correction over a large portion of the page length in a relatively even manner can be used to convert the utilization device from English System measurement standards to Metric System measurement standards. For example, most printing and utilization devices are calibrated to operate either using English System measurements (e.g., ⅛ inch or, preferably, ⅙ inch increments), or using Metric System measurements (e.g., millimeters) exclusively. FIG. 35 illustrates a block diagram detailing the conversion from English System measurements (from ⅙ inch. increments) to Metric System measurements (to millimeters). In this example we assume that the operator wishes to employ a continuous web having its printed registration marks spaced according to a Metric standard, such as the A4 standard for page lengths. To properly feed an A4 page length, the utilization device, which operates in the English standard in this embodiment, is now modified to accept the A4 measurements accurately.

It should be noted that the registration controller described above automatically adjusts the drive system to accurately register on the marks for A4. However, this procedure allows the adjustment to occur automatically, for greater reliability and versatility. First, the operator instructs the registration controller at start up that Metric standard pages are to be used. Since the pulses generated by the central drive motor (the standard used by the image drum and tractor pin feed units) are proportional to ⅙ inch. increments, the precise millimeter page size will generate a rounding error versus ⅙ inch. page increments. For example, A4 pages have a length of 11.39 inches, while the increments closest to A4 will equal approximately 11.333 inches (68/6ths inches). This rounding error is the limit to how accurately the English standard utilization device can track the Metric pages without registration control. Uncorrected, the system would lose approximately 0.03 inch per page.

In step 900, the operator then programs the controller to expect a first page (top of form as described above) having a length of approximately 11.333 inches (the "closest-inch" value). This value can be preprogrammed as a set value for A4. A number of set closest-inch values can be provided to the controller for different standard Metric page sizes. An initial page is then passed through the system in step 902 as a "non-process run." In other words, no printing in performed on the initial page, it is simply run through the utilization device element (the image drum) to allow marks on the web to be read. (Note that this procedure can be performed on a conventional English system run described in the preceding embodiment, as well. In both cases, the web can be reversed subsequent to mark reading so that its leading edge or "top of form" is adjacent to the contact point of the image drum.). The marks will be located at Metric standard page spacings. When the marks are read, the actual distance will be read as 11.39 inches. Since the controller knows that a Metric page is specified, it will select the closest standard Metric page length (e.g., 11.39 inches) in step 904. It selects the closest standard Metric page length by consulting a basic lookup table in the registration controller that provides an exact Metric page length corresponding to a range of read values. Note that read values are determined by reading the offset of the sensed mark from the "expected" location of the mark would be the nearest English page length equivalent. A standard correction factor is now provided based upon the difference between the English form length and the nearest Metric standard form length. The correction factor can be derived from an appropriate lookup table, or can be calculated using a Metric-English conversion function. The correction factor represents the approximate difference between a ⅙ inch page increment and a standard millimeter page increment measurement. This Metric correction factor becomes an automatically input correction factor that is spread over the entire page length using the procedure described above in FIG. 34. Each page length measured in step 802 is provided with the automatic Metric correction factor at the outset of measurement.

The registration drive motor is utilized to provide the automatic Metric correction factor in step 906 (FIG. 35) the correction factor, again, is spread throughout the page length to avoid jump discontinuities or other undesirable processing errors. Of course, any other offset in the web travel versus the operation of the image drum is detected and further correction is derived where appropriate. The further correction is also input into the registration drive motor and spread over the entire page length as described in steps 810 and 812. The use of an automatic correction factor is desirable since it ensures that every Metric page will be accurately tracked at the outset. The use of an auxiliary registration controller and motor according to this invention particularly makes possible an accommodation for "round off error" between English increments and Metric increments in a utilization device that uses one or the other exclusively.

Note that the procedures described above can be used equally effectively where the utilization device is calibrated in Metric increments and English standard pages are to be employed. Each of the steps described herein would simply substitute English measurements for Metric measurements and vice versa.

Note that, in an alternate embodiment, the spreading of registration according to any of the above embodiments can be accomplished over a group of pages or sections that are measured based upon the total length of the group. In other words, several pages or sections can be measured, and the movement of the registration motor occurs as the entire group of pages or sections passes through the image drum. The marks can be spaced so that they define the group, or a mark can be provided between each page or section, or subgroups of pages or sections within the overall group. However, the correction movement by the registration motor is averaged over the entire group of pages or sections.

The foregoing has been a detailed description of preferred embodiments. Various modifications and additions can be made without departing from the spirit and scope of this invention. For example, while a roller drive is used according to this invention, belts or vacuum drive units, among others, can be substituted. A harmonic drive is used as a registration differential. However, a variety of other forms of differential and advance/retard mechanisms are also contemplated. Likewise, the sensors employed can be optical, ultrasonic or any other acceptable form of remote or contacting sensor.

Accordingly, this description is meant to be taken only by way of example and not to otherwise limit the scope of the invention.

What is claimed is:

1. A method for controlling movement of a continuous pinless web that is free of tractor pin feed holes on edges thereof through a high-volume electronic printer adapted to feed a web having tractor pin feed holes on edges thereof, the printer having a moving image transfer element that performs print operations at selected locations on the web, the printer including a drive section having a drive roller that directs the web through the image transfer element, the drive roller being operatively connected to a central drive motor and wherein the drive roller moves in synchronization with movement of the image transfer element and the printer further including a fuser section, downstream in a direction of web travel from the image transfer element, the fuser section having a fuser drive element for drawing the web from the image transfer element at a selected draw rate, the printer including, between the image transfer element and the fuser section, (1) a dancer that moves in proportion to an amount of web between the image transfer element and the fuser section to generate a dancer signal that indicates an amount of tautness or slack in the web and (2) a skew/advance sensor that reads passage of tractor pin feed holes to generate (a) a time-based, pulsed skew signal that indicates a location of an edge of the web in a direction transverse to the downstream direction and (b) a time-based, pulsed advance/retard signal that indicates a relative location of the web as the web moves in the downstream direction, the printer also including a fuser section controller that controls the draw rate of the fuser drive element based upon the dancer signal and the advance/retard signal, and that steers the web transverse to the downstream direction in response to the skew signal, the method comprising the steps of:

providing a pinless web to the printer that includes a substantially continuous edge free of tractor pin feed holes therealong;

deriving drive pulses as predetermined length increments of the pinless web pass through the image transfer element based upon movement of the drive roller;

deriving fuser pulses as predetermined length increments of pinless web pass through the fuser section based upon movement of the fuser drive element;

passing one of the edges of the pinless web under an edge location sensor and thereby generating an edge location signal in response to a location of the edge in the direction transverse to the downstream direction as the edge moves therepast including deriving a time-based, pulsed skew signal proportional to a relative offset of the edge from a predetermined location in the direction transverse to the downstream direction;

comparing a number of drive pulses to a number of fuser pulses and thereby deriving a time-based, pulsed advance/retard signal of a relative position of the pinless web in the downstream direction at each of the image transfer element and the fuser section; and controlling the steering of the pinless web by the fuser section and the draw rate of the pinless web by the fuser drive element based upon the time-based pulsed skew signal and the time-based, pulsed advance/retard signal.

2. The method as set forth in claim 1 wherein the step of comparing includes counting each of the drive pulses and the fuser pulses and comparing a sum of the drive pulses to a sum of the fuser pulses.

3. The method as set forth in claim 2 wherein the step of counting includes monitoring a position of the dancer and, if the dancer moves beyond a predetermined limit, resetting the step of counting to begin counting each of the fuser pulses and the drive pulses from a new initial point, and establishing the new initial point by operating the fuser drive element at a different draw rate relative to a drive speed of the drive roller until the dancer is moved to a desired position.

4. The method as set forth in claim 3 wherein the step of deriving the time-based, pulsed advance/retard signal includes producing a signal having a predetermined time duration at predetermined time intervals based upon a difference between the sum of the drive pulses from the sum of the fuser pulses.

5. The method as set forth in claim 4 wherein the step of producing includes addressing a look-up table that associates signal time durations with differences between drive pulses and fuser pulses to identify a relative value contained therein for the time duration with respect to the difference.

6. The method as set forth in claim 1 wherein the step of deriving the time-based, pulsed skew signal includes producing a signal having a predetermined time duration at predetermined time intervals based upon an amount of edge of the pinless web that is sensed by the edge location sensor.

7. The method as set forth in claim 6 wherein the step of producing includes addressing a look-up table that associates signal time durations with the amount of the edge sensed to identify a relative value contained therein for the time duration with respect to the amount of the edge.

8. A control system for controlling movement of a continuous pinless web that is free of tractor pin feed holes on edges thereof through a high-volume electronic printer adapted to feed a web having tractor pin feed holes on edges thereof, the printer having a moving image transfer element that performs print operations at selected locations on the web, the printer including a drive section that directs the web through the image transfer element, the printer further including a fuser section, downstream in a direction of web travel from the image transfer element, the fuser section having a fuser drive element for drawing the web from the image transfer element at a selected draw rate, the printer further including, between the image transfer element and the fuser section, (1) a dancer that moves in proportion to an amount of web between the image transfer element and the fuser section to generate a dancer signal that indicates an amount of tautness or slack in the web and (2) a skew/advance sensor that reads passage of tractor pin feed holes to generate (a) a time-based, pulsed skew signal that indicates a location of an edge of the web in a direction transverse to the downstream direction and (b) a time-based, pulsed advance/retard signal that indicates a relative location of the web as the web moves in the downstream direction, the printer also including a fuser section controller that controls the draw rate of the fuser drive element based upon the dancer signal and the advance/retard signal, and that steers the web transverse to the downstream direction in response to the skew signal, the control system comprising:

a drive mechanism, the drive mechanism being operatively connected to a central drive motor and wherein the drive mechanism moves in synchronization with movement of the image transfer element;

a registration controller, having a differential and separate registration motor, utilized to synchronize the movement of the web through the printer;

a mark sensor, located upstream of the image transfer element, which reads marks on the web; and an edge location sensor, operatively connected to the registration controller, that generates a signal proportional to an amount of sensor area that is covered by the edge of the web.

9. The control system as set forth in claim 8 wherein the drive mechanism is a drive roller.

10. The control system as set forth in claim 9 wherein the drive roller is a full width drive roller.

11. The control system as set forth in claim 8 wherein the drive mechanism is a drive belt.

12. The control system as set forth in claim 8 wherein the drive mechanism is a reciprocating foot.

13. The control system as set forth in claim 8 wherein the drive mechanism is a reciprocating shoe.

14. The control system as set forth in claim 8 wherein the edge sensor is an optical sensor.

15. The control system as set forth in claim 8 wherein the control system firther includes a vacuum belt drive operatively connected to a tractor pin feed assembly.

16. The control system as set forth in claim 8 wherein the drive motor further includes an advance and retard mechanism that is responsive to the registration controller to maintain the driven web in synchronization with the utilization device element.

* * * * *